US012786925B2

(12) United States Patent
Shin et al.

(10) Patent No.: US 12,786,925 B2
(45) Date of Patent: Nov. 3, 2026

(54) METHOD AND APPARATUS FOR CONTROLLING SIMULTANEOUS ACCESS OF TERMINAL TO TERRESTRIAL AND NON-TERRESTRIAL NETWORKS

(71) Applicant: ELECTRONICS AND TELECOMMUNICATIONS RESEARCH INSTITUTE, Daejeon (KR)

(72) Inventors: Jae Wook Shin, Daejeon (KR); Sook Yang Kang, Daejeon (KR); Chul Park, Daejeon (KR); Myungsan Bae, Daejeon (KR); Hyung Deug Bae, Daejeon (KR); JaeSheung Shin, Daejeon (KR); Sung-Min Oh, Daejeon (KR); Kwang Ryul Jung, Daejeon (KR); You Sun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 270 days.

(21) Appl. No.: 18/799,698

(22) Filed: Aug. 9, 2024

(65) Prior Publication Data

US 2025/0056464 A1 Feb. 13, 2025

(30) Foreign Application Priority Data

Aug. 11, 2023 (KR) ........................ 10-2023-0105485
Aug. 2, 2024 (KR) ........................ 10-2024-0103306

(51) Int. Cl.
*H04W 48/16* (2009.01)
*H04W 60/00* (2009.01)
*H04W 76/15* (2018.01)

(52) U.S. Cl.
CPC ......... *H04W 60/005* (2013.01); *H04W 48/16* (2013.01); *H04W 76/15* (2018.02)

(58) Field of Classification Search
CPC ..... H04W 76/15; H04W 60/005; H04W 8/24; H04W 48/16
See application file for complete search history.

(56) References Cited

U.S. PATENT DOCUMENTS 11,064,388 B2 7/2021 Kim et al.
11,184,800 B2 11/2021 Kim et al.
(Continued)

FOREIGN PATENT DOCUMENTS

KR 10-2022-0106623 A 7/2022

OTHER PUBLICATIONS

IP.com search history (Year: 2026).*
Orbit.com search history (Year: 2026).*

*Primary Examiner* — Moustapha Diaby
(74) *Attorney, Agent, or Firm* — Rabin & Berdo, P.C.

(57) ABSTRACT

A method of a terminal may comprise: selecting one of a TN base station or NTN base station as a first base station; performing a first access registration procedure between the terminal and a core network through the first base station; identifying whether the core network supports dual-steering, based on a result of the first access registration procedure; in response to identifying that the core network supports dual-steering, performing a second access registration procedure between the terminal and the core network through a second base station other than the first base station among the TN base station or the NTN base station; and in response to a success of the second access registration procedure, performing a multiple access (MA) protocol data unit (PDU) session establishment procedure according to dual-steering through the first base station.

20 Claims, 12 Drawing Sheets

(56) References Cited

U.S. PATENT DOCUMENTS

| | | | | |
|---|---|---|---|---|
| 2022/0070812 | A1 | 3/2022 | Cheng | |
| 2022/0104075 | A1* | 3/2022 | Lin | H04W 28/0268 |
| 2022/0110051 | A1 | 4/2022 | Catovic et al. | |
| 2022/0232465 | A1* | 7/2022 | Tsuda | H04W 76/10 |
| 2022/0369266 | A1 | 11/2022 | Gruber et al. | |
| 2023/0122634 | A1* | 4/2023 | Uchino | H04W 8/24 455/427 |
| 2023/0247705 | A1 | 8/2023 | Kumar et al. | |
| 2023/0254803 | A1 | 8/2023 | Lu et al. | |
| 2026/0025234 | A1* | 1/2026 | Suh | H04L 1/18 |

* cited by examiner

METHOD AND APPARATUS FOR CONTROLLING SIMULTANEOUS ACCESS OF TERMINAL TO TERRESTRIAL AND NON-TERRESTRIAL NETWORKS

CROSS-REFERENCE TO RELATED APPLICATIONS

This application claims priority to Korean Patent Applications No. 10-2023-0105485, filed on Aug. 11, 2023, and No. 10-2024-0103306, filed on Aug. 2, 2024, with the Korean Intellectual Property Office (KIPO), the entire contents of which are hereby incorporated by reference.

BACKGROUND

1. Technical Field

The present disclosure relates to an access control technique in a communication system, and more particularly, to a technique for controlling simultaneous access of a terminal to a terrestrial network and a non-terrestrial network in a communication system supporting both the terrestrial network and the non-terrestrial network.

2. Related Art

In the 5th generation communication system, a communication range is expanded to include non-terrestrial networks (NTNs) in addition to the traditional terrestrial networks (TNs). Terminals are no longer limited to personal mobile phones but can be embedded as communication modules in various objects existing in terrestrial and non-terrestrial spaces. Representative examples of NTNs include low earth orbit (LEO) satellites and geostationary earth orbit (GEO) satellites. The satellite-based NTNs can provide much broader coverage compared to TNs, making them effective in delivering communication services in mountainous or island regions, aerial zones, underdeveloped countries with poor communication environments, or disaster areas where the existing TNs are destroyed or unavailable. However, the NTNs have greater transmission latencies and relatively slower data transmission rates compared to the TNs.

In the existing communication systems, the access traffic steering, switching, and splitting (ATSSS) features allow terminals to simultaneously connect to 3rd generation partnership project (3GPP) access and non-3GPP access to receive services. For example, a terminal can simultaneously connect to new radio (NR)-based 3GPP access and WiFi-based non-3GPP access, distributing traffic between the two accesses to enhance service speed or transmitting duplicated data through both accesses to improve transmission reliability. However, in the existing mobile communication network, the functionality supporting simultaneous connections of 3GPP access and non-3GPP access has not yet been provided. The satellite-based NTN are already defined within the scope of 3GPP access, and the importance of NTN is expected to increase in the future. In this context, dual steering functionality between TN and NTN networks may be required as an essential feature of next-generation mobile communication networks.

SUMMARY

The present disclosure for resolving the above-described problems is directed to providing a method and an apparatus for controlling a dual-steering function in a communication system capable of providing simultaneous communication services through both of terrestrial radio access and non-terrestrial radio access.

A method of a terminal, according to exemplary embodiments of the present disclosure for achieving the above-described objective, may comprise: selecting one of a terrestrial network (TN) base station or a non-terrestrial network (NTN) base station as a first base station; performing a first access registration procedure between the terminal and a core network through the first base station; identifying whether the core network supports dual-steering, based on a result of the first access registration procedure; in response to identifying that the core network supports dual-steering, performing a second access registration procedure between the terminal and the core network through a second base station other than the first base station among the TN base station or the NTN base station; and in response to a success of the second access registration procedure, performing a multiple access (MA) protocol data unit (PDU) session establishment procedure according to dual-steering through the first base station.

The TN base station and the NTN base station may be base stations belonging to a home public land mobile network (PLMN), and when an access priority of the TN base station is higher than an access priority of the NTN base station, the terminal may select the TN base station as the first base station according to the access priorities.

The performing of the MA PDU session establishment procedure may comprise: transmitting, to the core network, a PDU session establishment request including at least one of information indicating an MA PDU session according to dual-steering or session identifier (ID) information; receiving a response to the PDU session establishment request from the core network; and identifying whether the MA PDU session establishment procedure is successful based on the response, wherein when the response indicates acceptance of PDU session establishment, the MA PDU session establishment procedure may be determined to be successful, and the PDU session establishment request and the response may be transmitted and received through the first base station.

The method may further comprise: in response to identifying that the MA PDU session establishment procedure is successful based on a result of the MA PDU session establishment procedure, performing data communication between the terminal and the core network, wherein the data communication may be performed through at least one of the first base station or the second base station.

The performing of the first access registration procedure may comprise: performing a radio resource control (RRC) connection establishment procedure between the terminal and the first base station; transmitting a first registration request including at least one of registration type information or dual-steering capability information to the core network; performing an identification procedure, an authentication procedure, and a non-access stratum (NAS) security control procedure between the terminal and the core network; performing an access stratum (AS) security control procedure with the first base station; receiving a response to the first registration request from the core network; and identifying whether the core network supports dual-steering, based on the response indicating acceptance of registration.

The registration request and the response to the registration request may be transmitted and received through the first base station, and when the response includes dual-steering support information indicating whether dual-steering is supported, the registration request may be determined to be successfully performed.

The performing of the second access registration procedure may comprise: performing an RRC connection establishment procedure between the terminal and the second base station; transmitting, to the core network, a registration request including information indicating mobility registration updating; performing a NAS security control procedure between the terminal and the core network; performing an AS security control procedure between the terminal and the second base station; and receiving a response to the registration request from the core network, wherein communication between the terminal and the core network may be performed through the second base station, and when the response indicates acceptance of registration, the second access registration procedure is determined to be successful.

The method may further comprise: in response to identifying that the core network does not support dual-steering, performing a single access (SA) PDU session establishment procedure through the first base station, wherein in the SA PDU session establishment procedure, the terminal transmits an SA PDU session request to the core network, the terminal receives an SA PDU session response from the core network, and when the terminal receives a PDU session establishment accept in response to the SA PDU session request from the core network, the SA PDU session establishment may be determined to be successful.

A method of a terminal, according to exemplary embodiments of the present disclosure for achieving the above-described objective, may comprise: selecting a terrestrial network (TN) base station; performing a first access registration procedure between the terminal and a core network; identifying whether the core network supports dual-steering, based on a result of the first access registration procedure; in response to identifying that the core network supports dual-steering, performing a first protocol data unit (PDU) session establishment procedure between the terminal and the core network; in response to that the terminal camps on a non-terrestrial network (NTN) base station, performing a second access registration procedure between the terminal and the core network; and in response to a success of the second access registration procedure, performing a second PDU session establishment procedure between the terminal and the core network, wherein in the first access registration procedure and the first PDU session establishment procedure, communication between the terminal and the core network may be performed through the TN base station, and in the second access registration procedure and the second PDU session establishment procedure, communication between the terminal and the core network may be performed through the NTN base station.

The TN base station and the NTN base station may be base stations belonging to a home public land mobile network (PLMN), the terminal may be able to use only one of the TN base station or the NTN base station, and the terminal may camp on the NTN base station after the terminal performs camping-on, registration, and PDU session establishment procedures with the TN base station.

The performing of the first PDU session establishment procedure may comprise: transmitting, to the core network, a first PDU session establishment request including at least one of first information indicating a multiple access (MA) PDU session according to dual-steering or first session identifier (ID) information; receiving a first response to the first PDU session establishment request from the core network; and determining whether the first PDU session establishment procedure is successful based on the first response, wherein when the first response indicates acceptance of PDU session establishment, the first PDU session establishment procedure may be determined to be successful.

The performing of the second PDU session establishment procedure may comprise: transmitting, to the core network, a second PDU session establishment request including at least one of second information indicating an MA PDU session according to dual-steering or second session ID information; receiving a second response to the second PDU session establishment request from the core network; and determining whether the second PDU session establishment procedure is successful based on the second response, wherein when the second response indicates acceptance of PDU session establishment, the second PDU session establishment procedure may be determined to be successful, and the second session ID information included in the second PDU session establishment request may include a session ID identical to the first session ID information included in the first PDU session establishment request in the first PDU session establishment procedure.

The performing of the first access registration procedure may comprise: transmitting, to the core network, a first registration request including at least one of registration type information or dual-steering capability information; receiving a first response to the first registration request from the core network; and determining whether the first access registration procedure is successful based on the first response, wherein when the first response indicates acceptance of registration including dual-steering support information indicating whether the core network supports dual-steering, the first registration procedure may be determined to be successful.

The performing of the second access registration procedure may comprise: transmitting, to the core network, a second registration request including information indicating mobility registration updating; receiving a second response to the second registration request from the core network; and determining whether the second access registration procedure is successful based on the second response, wherein when the second response indicates acceptance of registration, the second access registration procedure may be determined to be successful.

The performing of the first access registration procedure may comprise: performing a first identification procedure between the terminal and the core network; performing a first authentication procedure between the terminal and the core network; and performing a first non-access stratum (NAS) security control procedure between the terminal and the core network.

The performing of the second access registration procedure may comprise: performing a second NAS security control procedure between the terminal and the core network, and in the second access registration procedure, an identification procedure and authentication procedure between the terminal and the core network may be omitted.

The method may further comprise: in response to identifying that the core network does not support dual-steering, performing a signal access (SA) PDU session establishment procedure, wherein in the SA PDU session establishment procedure, the terminal transmits an SAPDU session request to the core network, the terminal receives an SA PDU session response from the core network, and when the terminal receives a PDU session establishment accept in response to the SA PDU session request from the core network, the SA PDU session establishment procedure may be determined to be successful, and in the SA PDU session establishment procedure, communication between the terminal and the core network may be performed through the TN base station.

A terminal, according to exemplary embodiments of the present disclosure for achieving the above-described objective, may comprise at least one process, wherein the at least one processor causes to the terminal to perform: performing a first access registration procedure between the terminal and a core network through a terrestrial network (TN) base station; identifying whether the core network supports dual-steering based on a result of the first access registration procedure; in response to identifying that the core network supports dual-steering, performing a first protocol data unit (PDU) session establishment procedure between the terminal and the core network; in response to the terminal camping on a non-terrestrial network (NTN) base station, performing a second access registration procedure between the terminal and the core network; and in response to a success of the second access registration procedure between the terminal and the core network, performing a second PDU session establishment procedure between the terminal and the core network, wherein the TN base station may be a base station belonging to a home public land mobile network (PLMN), and the NTN base station may be a base station belonging to a visited PLMN.

In the first PDU session establishment procedure, the at least one processor may cause the terminal to perform: transmitting, to the core network, a first PDU session establishment request including at least one of first information indicating a multiple access (MA) PDU session according to dual-steering or first session identifier (ID) information; and receiving a first response to the first PDU session establishment request from the core network, wherein when the first response indicates acceptance of PDU session establishment, the first PDU session establishment procedure may be determined to be successful.

In the second PDU session establishment procedure, the at least one processor may cause the terminal to perform: transmitting, to the core network, a second PDU session establishment request including at least one of second information indicating an MA PDU session according to dual-steering or second session ID information; and receiving a second response to the second PDU session establishment request from the core network, wherein when the second response indicates acceptance of PDU session establishment, the second PDU session establishment procedure may be determined to be successful.

According to the exemplary embodiments of the present disclosure, the communication system can support both a TN and an NTN. The terminal can support dual-steering. When the terminal is turned on, the terminal can perform an initial registration procedure with priority given to a cell belonging to a home PLMN or TN.

When the TN and NTN belong to the same PLMN, a simplified registration procedure can be performed during a registration procedure through a second access. On the other hand, when the TN and NTN belong to different PLMNs, an initial registration procedure can be performed through each access, and during the registration procedure, the terminal and the core network can mutually exchange information on whether each supports the dual-steering function.

Based on the support for the dual-steering function, the terminal can perform a PDU session establishment procedure. Consequently, the dual-steering function can be effectively controlled between the terminal and the core network, enhancing the performance of the communication system.

DETAILED DESCRIPTION OF THE EMBODIMENTS

Figure 1:
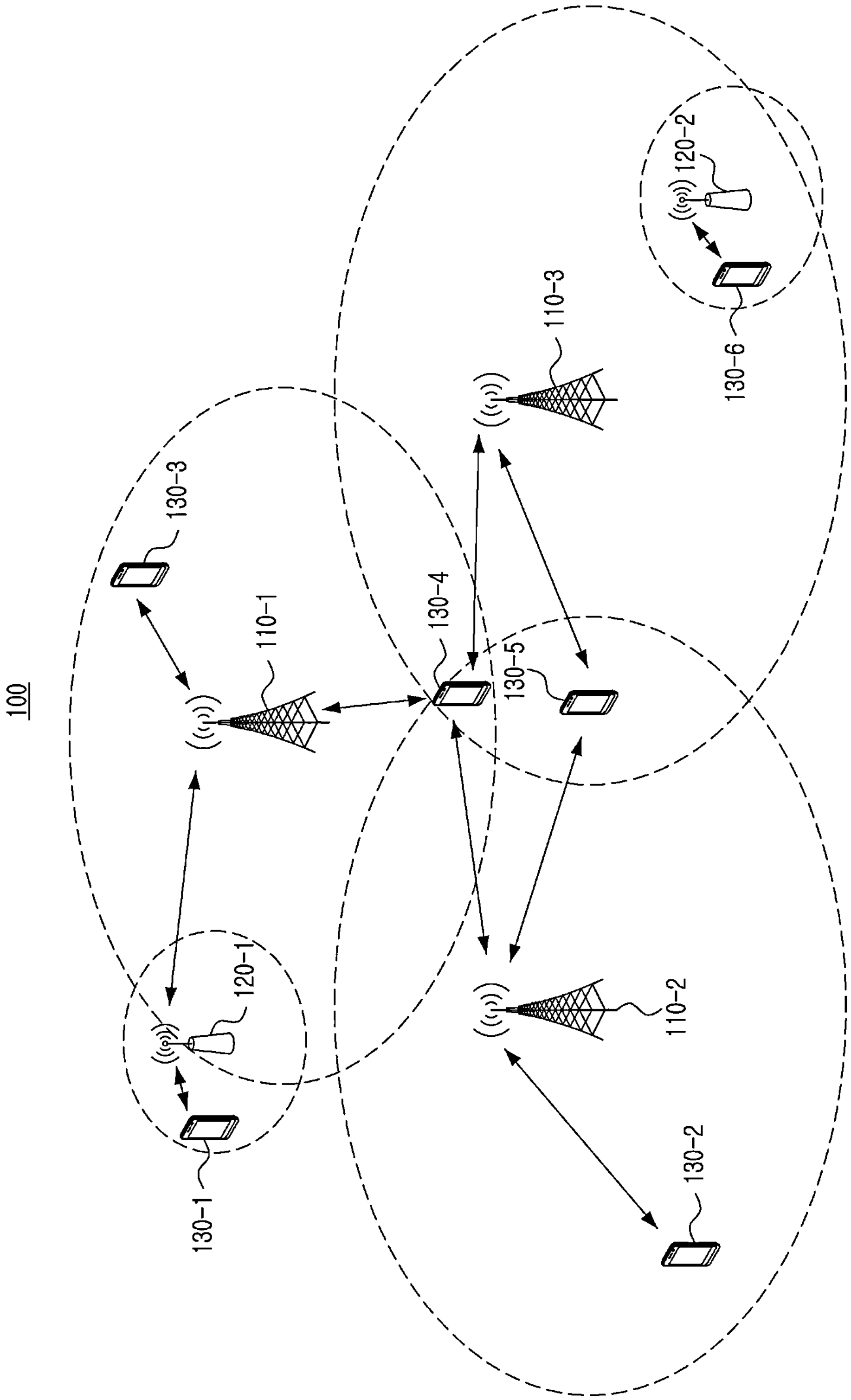
FIG. 1 is a conceptual diagram illustrating an exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g. 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g. long term evolution (LTE), LTE-advanced (LTE-A)), 5G communication (e.g. new radio (NR)), 6G communication, etc. specified in the 3rd generation partnership project (3GPP) standards. The 4G communication may be performed in frequency bands below 6 GHz, and the 5G and 6G communication may be performed in frequency bands above 6 GHz as well as frequency bands below 6 GHz.

For example, in order to perform the 4G communication, 5G communication, and 6G communication, the plurality of communication may support a code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform spread OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter bank multi-carrier (FBMC) based communication protocol, universal filtered multi-carrier (UFMC) based communication protocol, space division multiple access (SDMA) based communication protocol, orthogonal time-frequency space (OTFS) based communication protocol, or the like.

Further, the communication system 100 may further include a core network. When the communication 100 supports 4G communication, the core network may include a serving gateway (S-GW), packet data network (PDN) gateway (P-GW), mobility management entity (MME), and the like. When the communication system 100 supports 5G communication or 6G communication, the core network may include a user plane function (UPF), session management function (SMF), access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
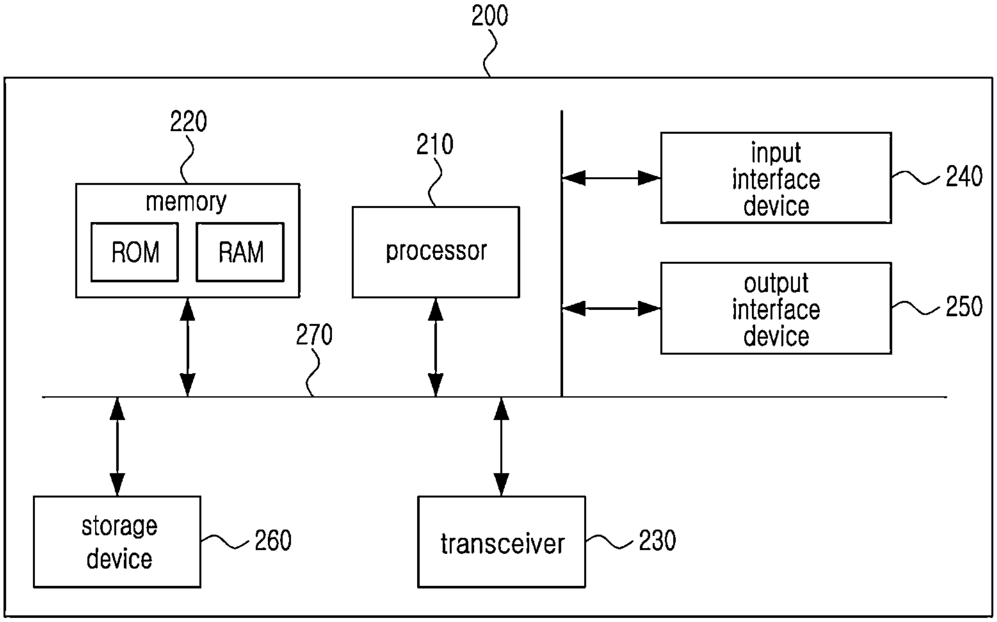
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), evolved Node-B (eNB), gNB, base transceiver station (BTS), radio base station, radio transceiver, access point, access node, road side unit (RSU), radio remote head (RRH), transmission point (TP), transmission and reception point (TRP), or the like.

Each of the plurality of terminals 130-1, 130-2, 130-3, 130-4, 130-5, and 130-6 may refer to a user equipment (UE), terminal, access terminal, mobile terminal, station, subscriber station, mobile station, portable subscriber station, node, device, Internet of Thing (IoT) device, mounted module/device/terminal, on-board device/terminal, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g. a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner.

Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the COMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner.

Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission and reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3:
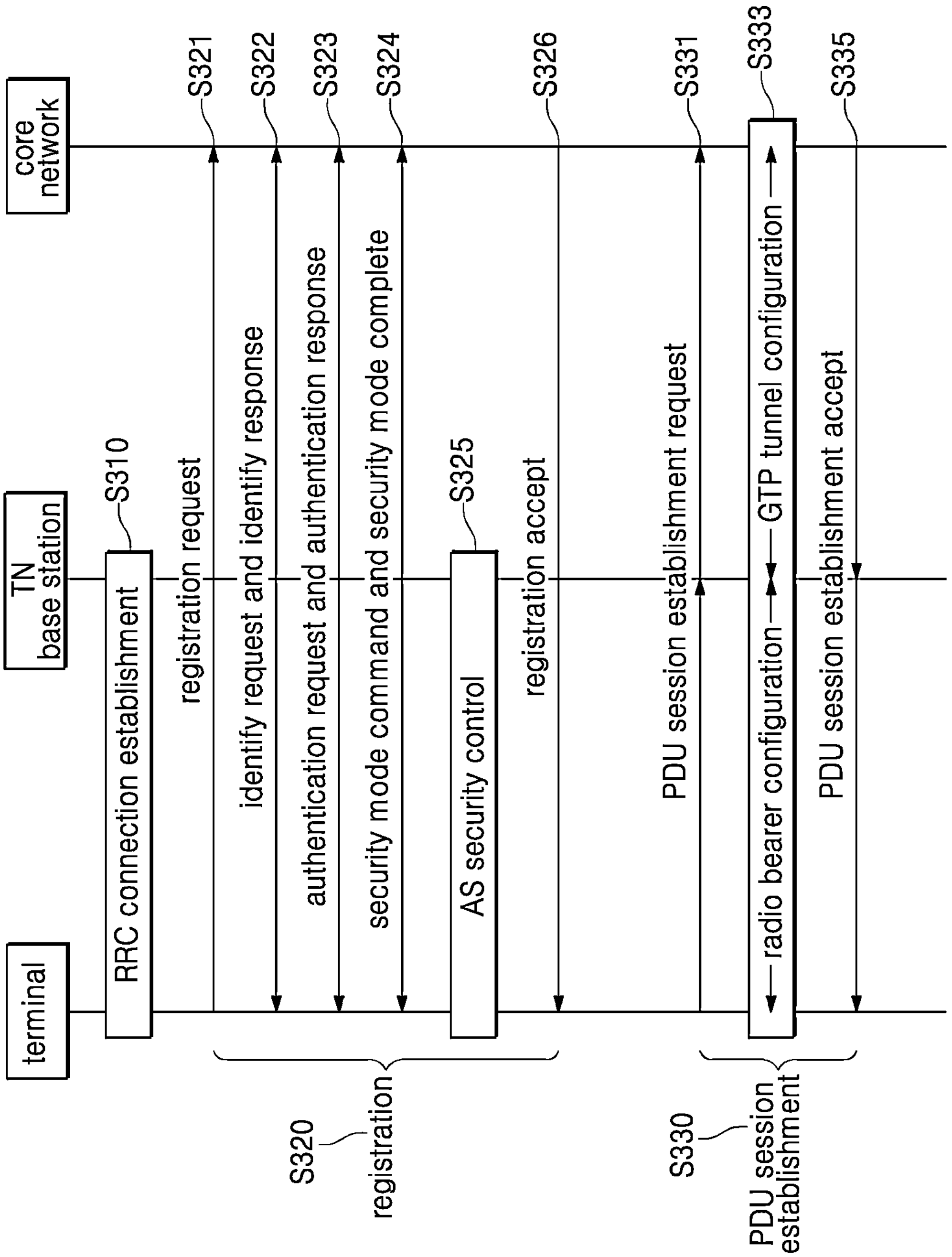
FIG. 3 is a sequence chart illustrating a registration procedure and a PDU session establishment procedure in a communication system.

FIG. 3 is a sequence chart illustrating a registration procedure and a PDU session establishment procedure in a communication system.

Referring to FIG. 3, a communication system may include a base station, a terminal, and a core network, and the communication system may support 5G communication (e.g. NR). The base station may be the base station 110-1, 110-2, 110-3, 120-1, or 120-2 illustrated in FIG. 1, and the terminal may be the terminal 130-1, 130-2, 130-3, 130-4, 130-5, or 130-6 illustrated in FIG. 1. The base station and the terminal may be configured identically or similarly to the communication node illustrated in FIG. 2. As described above, the core network may include an AMF, SMF, UPF, etc. When the terminal is powered on, a registration procedure and a protocol data unit (PDU) session establishment procedure between the terminal and the core network may be performed.

In step S310, when the terminal is powered on, the terminal may select an accessible cell and perform an RRC connection establishment procedure. Through the RRC connection establishment procedure, a signaling (e.g. RRC signaling) connection between the terminal and the base station may be established.

When the signaling connection between the terminal and the base station is established, the terminal may initiate a registration procedure (S320) between the terminal and the core network.

In step S320, the terminal may transmit a registration request message to the core network. The core network (e.g. AMF) may receive the registration request message from the terminal (S321). When the core network receives the registration request message from the terminal, the core network may initiate an identification procedure. In the identification procedure, the core network may transmit an identity request to the terminal. The terminal may transmit an identity response in response to the identity request, and the core network may receive the identity response from the terminal (S322).

In step S320, the core network may perform an authentication procedure to verify whether the terminal is a suitable terminal based on the identity response received from the terminal. In the authentication procedure, the core network may transmit an authentication request to the terminal. In response to the authentication request of the core network, the terminal may transmit an authentication response to the core network. The core network may verify whether the terminal is a suitable terminal using the authentication response of the terminal (S323). Thereafter, for security configuration consisting of ciphering and integrity protection, the core network may initiate a security control procedure.

In step S320, when the security control procedure is initiated, a non-access stratum (NAS) security control procedure between the terminal and the core network may be performed. In the NAS security control procedure between the terminal and the core network, the core network may transmit a security mode command to the terminal. In response to the security mode command received from the core network, the terminal may transmit a security mode complete to the core network. The core network may receive the security mode complete from the terminal (S324). When the NAS security control procedure between the terminal and the core network is successfully completed, an access stratum (AS) security control procedure between the terminal and the base station may be performed (S325). After the AS security control procedure between the terminal and the base station is performed, the terminal may receive a registration accept indicating that the registration request is accepted from the core network (S326). Then, in order for the terminal to access a specific data network and receive a service, the terminal may initiate a PDU session establishment procedure.

In step S330, the PDU session establishment procedure initiated by the terminal may be performed. The terminal may transmit a PDU session establishment request to the core network (e.g. SMF). The core network may receive the PDU session establishment request (S331). The core network may initiate a resource configuration procedure for the terminal based on the PDU session establishment request received from the terminal. When the resource configuration procedure for the terminal is initiated, a general packet radio service (GPRS) tunnel protocol (GTP) tunnel may be configured between the base station and the core network (e.g. UPF), and a radio bearer may be configured between the terminal and the base station (S333). Then, the terminal may receive a PDU session establishment accept indicating that the PDU session establishment request is accepted from the core network (S335).

Although steps S310 to S335 have been described individually, this is not intended to limit the order in which the steps are performed. If necessary, the respective step may be performed simultaneously, in a different order, or combined.

[Communication System Composed of TN and NTN]

In the present disclosure, a communication system may provide both a terrestrial network (or radio access) and a non-terrestrial network (or radio access). A terminal may be able to receive communication services simultaneously through terrestrial and non-terrestrial radio accesses. When the terminal performs an initial registration procedure, the terminal may transmit a registration request including information indicating whether the terminal supports a dual-steering function to the core network. The core network may transmit a registration accept including information indicating whether the core network supports a dual-steering function to the terminal. Accordingly, whether the dual-steering function is supported may be identified in each of the terminal and the core network.

The terrestrial and non-terrestrial radio accesses may belong to the same public land mobile network (PLMN) or different PLMNs. The terminal may be registered in the core network through a secondary access procedure. When the terminal registers with the core network through the secondary access procedure while the terrestrial and non-terrestrial radio accesses belong to the same PLMN, the identification procedure and the authentication procedure between the terminal and the core network may be omitted.

When it is identified through the registration procedure that both the terminal and the core network support dual-steering, a dual-steering type multi-access (MA) PDU session establishment procedure may be performed. One service may be provided simultaneously through terrestrial and non-terrestrial radio accesses with different characteristics. By effectively controlling the dual-steering function, the overall communication reliability and service quality in the communication system can be improved.

Figure 4:
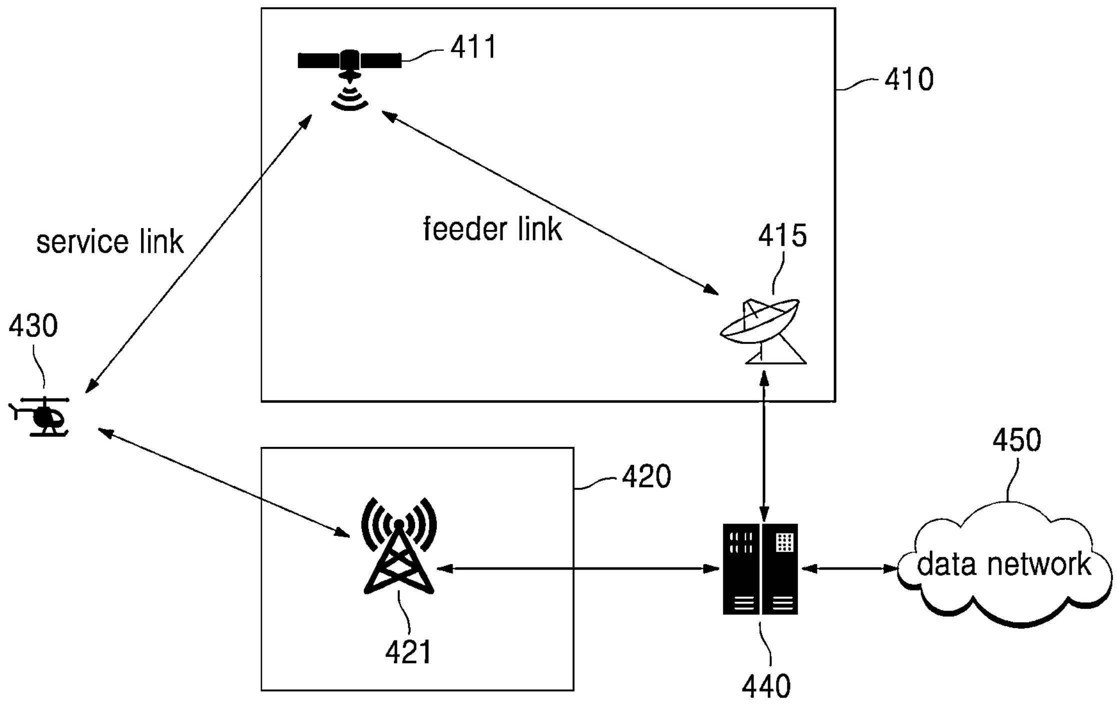
FIG. 4 is a conceptual diagram illustrating a communication system composed of a TN and an NTN according to exemplary embodiments of the present disclosure.

FIG. 4 is a conceptual diagram illustrating a communication system composed of a TN and an NTN according to exemplary embodiments of the present disclosure.

Referring to FIG. 4, a communication system may include an NTN-radio access network (RAN) 410, a TN-RAN 420, a terminal 430, a core network (CN) 440, and a data network (DN) 450. The terminal 430 may access the core network 440 through the NTN-RAN 410, and the terminal 430 may access the core network 440 through the TN-RAN 420. The NTN-RAN 410 may include a satellite 411 and a gateway 415. The TN-RAN 420 may include a base station 421. The CN 440 may provide access to the DN 450. The NTN illustrated in FIG. 4 may be a transparent payload-based NTN.

The NTN may be classified into a transparent-payload based NTN and a regenerative payload-based NTN depending on whether base station functionality is implemented on the satellite 411. In the transparent payload-based NTN, the satellite 411 may only perform a signal relay function between the terminal 330 and the gateway 415. In the regenerative payload-based NTN, the satellite 411 may include part or all of the base station functionality.

The satellite 411 may be a low earth orbit (LEO) satellite, a medium earth orbit (MEO) satellite, a geostationary earth orbit (GEO) satellite, a high elliptical orbit (HEO) satellite, or a unmanned aircraft system (UAS) platform. The UAS platform may include a high altitude platform station (HAPS).

The gateway 415 may be located on the ground, and a feeder link may be established between the satellite 411 and the gateway 415. The feeder link may be a radio link. The gateway 415 may be referred to as an NTN gateway. Communication between the satellite 411 and the gateway 415 may be performed based on an NR-Uu interface or a satellite radio interface (SRI). The gateway 415 may be connected to the DN 450 through the CN 440. The CN 440 may include an AMF, SMF, UPF, etc. as described above. Communication between the gateway 415 and the CN 440 may be performed based on an NG-C/U interface.

The terminal 430 may include a communication node located on the ground (e.g. user equipment (UE), terminal, etc.) and a communication node located in a non-terrestrial space (e.g. airplane, drone, urban air mobility (UAM), unmanned air vehicle (UAV), etc.). If the terminal 430 supports dual-radios, the terminal 430 may be connected to the TN and NTN simultaneously. A service link may be established between the satellite 411 and the terminal 430, and the service link may be a radio link. Communication between the base station 421 and the terminal 430 may be performed using a Uu interface (e.g. NR Uu interface). The base station 421 may be connected to the DN 450 through the CN 440.

[Support for Dual-Steering]

When the terminal is connected to a TN and NTN simultaneously by dual-steering, a TN base station and NTN base station may belong to the same PLMN or different PLMNs.

Figure 5:
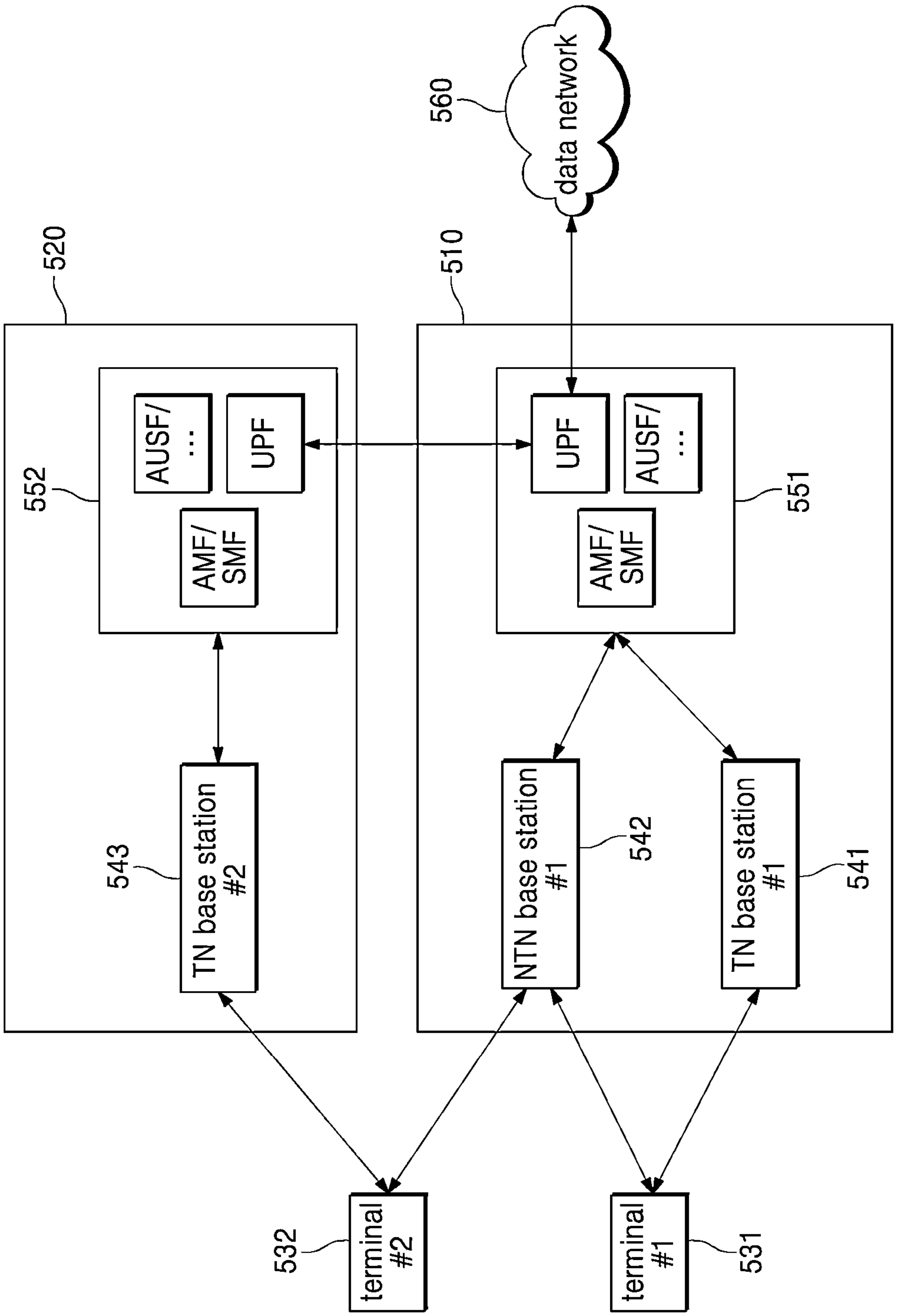
FIG. 5 is a conceptual diagram illustrating dual-steering for supporting simultaneous access to a TN and an NTN in a communication system according to exemplary embodiments of the present disclosure.

FIG. 5 is a conceptual diagram illustrating dual-steering for supporting simultaneous access to a TN and an NTN in a communication system according to exemplary embodiments of the present disclosure.

Referring to FIG. 5, a communication system may include a first PLMN 510 and a second PLMN 520. A first terminal (terminal #1) 531 and a second terminal (terminal #2) 532 may receive communication services from the first PLMN 510 through a TN and/or an NTN. A second terminal (terminal #2) 532 may receive communication services from the second PLMN 520 through the TN. The first PLMN 510 may include a first TN base station (TN base station #1) 541, a first NTN base station (NTN base station #1) 542, and a first core network (CN) 551. The second PLMN 520 may include a second TN base station (TN base station #2) 543 and a second CN 552. Each of the first CN 551 and the second CN 552 may include an AMF/SMF, a UPF, an authentication server function (AUSF), etc. The UPF of the first CN 551 may be connected to a data network (DN) 460. An interface may exist between the UPF of the first CN 551 and the UPF of the second CN 542. The first PLMN 510 may be a home PLMN of each of the first terminal 531 and the second terminal 532, and the second PLMN 520 may be a visited PLMN of each of the first terminal 531 and the second terminal 532.

FIG. 5 illustrates a case where the terminal accesses base stations belonging to the same PLMN and a case where the terminal accesses base stations belonging to different PLMNs. The first terminal 531 may access the first TN base station 541 and the first NTN base station 542 belonging to the same PLMN (i.e. first PLMN 510). The second terminal 532 may access base stations (i.e. first NTN base station 542 and second TN base station 543) belonging to different PLMNs (i.e. first PLMN 510 and second PLMN 520).

The terminal may access a TN base station and an NTN base station belonging to different PLMNs through dual steering. For example, the second terminal 532 may access the first NTN base station 542 and the second TN base station 543. The first NTN base station 541 which the second terminal 532 accesses may belong to the first PLMN 510. The second TN base station 543 which the second terminal 532 accesses may belong to the second PLMN 520. The NTN which the second terminal 532 accesses through dual steering may correspond to the first PLMN 510, and the TN which the second terminal 432 accesses through dual steering may correspond to the second PLMN 520. The first PLMN 510 may be a visited PLMN of the second terminal 532, and the second PLMN 520 may be a home PLMN of the second terminal 532. Service data (e.g. traffic data) may be transmitted and received between the first PLMN 510 and the second PLMN 520 through an interface between the UPF of the first PLMN 510 and the UPF of the second PLMN 520.

[Method 1]: Method for Terminal Registration and PDU Session Establishment Using Both a TN Cell and an NTN Cell Belonging to a Home PLMN Hereinafter, a method for terminal registration and PDU session establishment using both a TN cell and an NTN cell belonging to a home PLMN (hereinafter, Method 1) will be described. In Method 1, when a terminal supporting dual-steering is powered on, the terminal may search for a TN cell and an NTN cell respectively. The terminal may camp on each of the searched TN cell and NTN cell. An access priority for the TN cell and an access priority for the NTN cell may be set differently. If the access priority for the TN cell is higher than the access priority for the NTN cell, the terminal may access a TN base station to perform terminal registration and PDU session establishment procedures with a core network. Thereafter, the terminal may access an NTN base station to perform terminal registration and PDU session establishment procedures with a core network.

Figure 6:
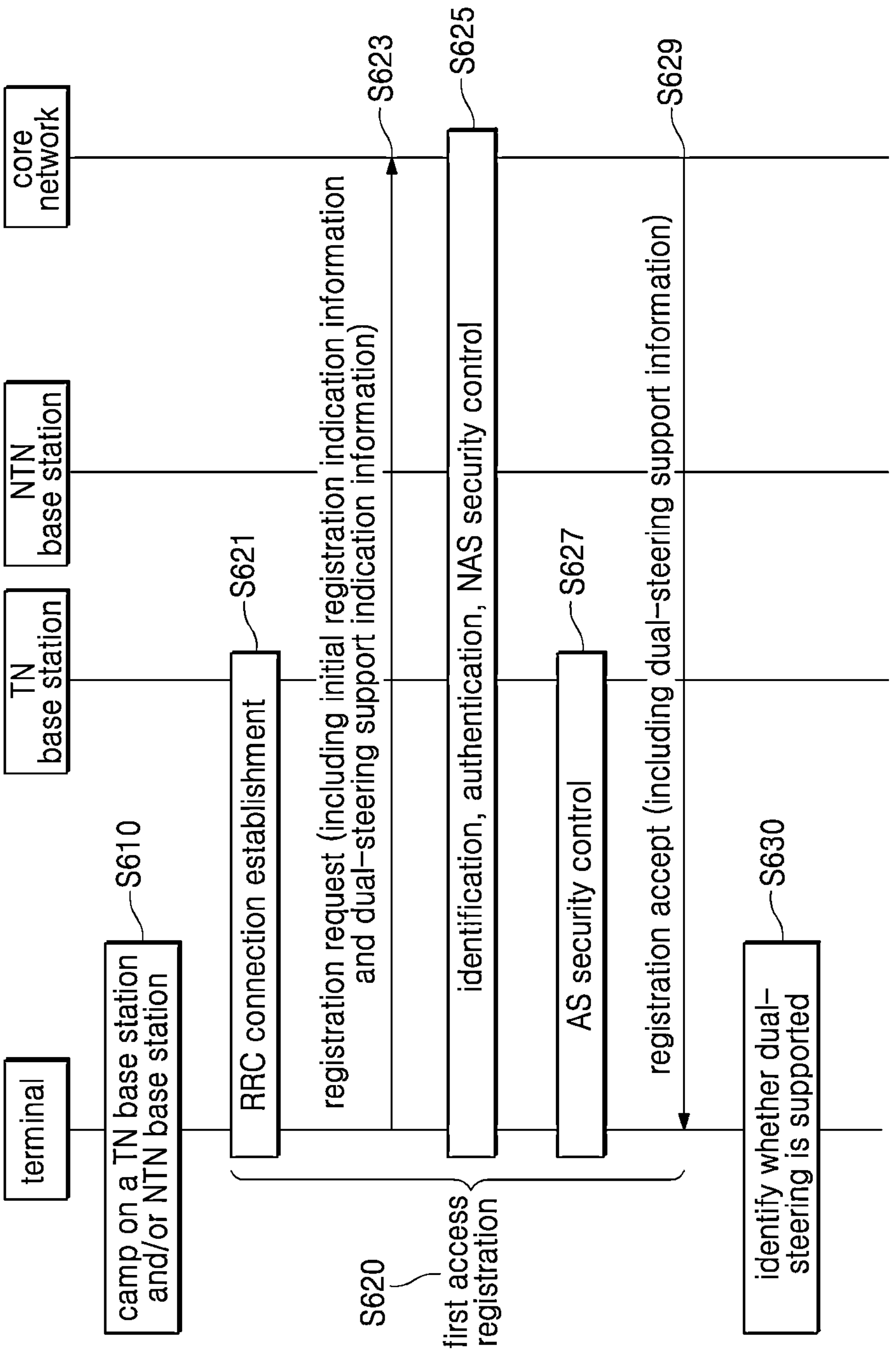
FIG. 6 is a sequence chart illustrating a first process for describing a registration method and a PDU session establishment method when using both a terrestrial cell and a non-terrestrial cell belonging to a home PLMN according to exemplary embodiments of the present disclosure.

FIG. 6 is a sequence chart illustrating a first process for describing a registration method and a PDU session establishment method when using both a terrestrial cell and a non-terrestrial cell belonging to a home PLMN according to exemplary embodiments of the present disclosure.

Referring to FIG. 6, a communication system may include a terminal, a TN base station, an NTN base station, and a core network. The terminal may be the terminal 531 illustrated in FIG. 5. The TN base station may be the TN base station 541 illustrated in FIG. 5. The NTN base station may be the NTN base station 542 illustrated in FIG. 5. The core network may be the core network 551 illustrated in FIG. 5. The terminal, the TN base station, and the NTN base station may be configured identically or similarly to the communication node illustrated in FIG. 2. When both the TN base station and the NTN base station belonging to a home PLMN are available to the terminal, the terminal may access the TN base station or the NTN base station according to an access priority of the TN base station and an access priority of the NTN base station. For example, if the access priority for the TN base station is higher than the access priority for the NTN base station, the terminal may access the TN base station and perform terminal registration with the core network. It may be assumed that the TN base station and the NTN base station belong to the home PLMN. It may be assumed that the terminal performs the initial registration procedure by giving priority to the TN cell access. In other words, it may be assumed that the access priority of the TN base station is higher than the access priority of the NTN base station. The TN base station may be expressed as a TN base station cell or TN cell, and the NTN base station may be expressed as an NTN base station cell or NTN cell.

In step S610, when the terminal is powered on, the terminal may search for the TN cell and the NTN cell, and the terminal may camp on the searched TN cell and NTN cell. For example, if the access priority of the TN base station is higher than the access priority of the TN base station, the terminal may select the TN base station from among the TN base station or the NTN base station to perform an initial registration procedure. The terminal may perform a first access registration procedure (step S620) to perform the initial registration procedure through the selected TN base station.

The terminal may access the TN base station or the NTN base station according to the access priority of the TN base station and the access priority of the NTN base station. The access priority of the TN base station and the access priority of the NTN base station may be preset in the terminal or may be set by the core network.

In an exemplary embodiment, the access priority of the TN base station may be set higher than the access priority of the NTN base station. If the access priority of the TN base station is set higher than the access priority of the NTN base station, the terminal may perform the first access registration procedure to perform the initial registration procedure through the TN base station.

In another exemplary embodiment, the access priority of the NTN base station may be set higher than the access priority of the TN base station. If the access priority of the NTN base station is set higher than the access priority of the TN base station, the terminal may perform the first access registration procedure to perform the initial registration procedure through the NTN base station.

In step S620, if the access priority of the TN base station is higher than the access priority of the NTN base station, the terminal may perform an RRC connection establishment procedure with the TN base station (S621). After the RRC connection establishment procedure between the terminal and the TN base station is successfully completed, the terminal may transmit a registration request to the core network (e.g. AMF). The core network (e.g. AMF) may receive the registration request from the terminal, and the registration request may include a registration type information indicating initial registration and/or dual-steering capability (or support) information (e.g. DS_Capable information) indicating that the terminal supports dual-steering (S623). The core network may perform an identification procedure, an authentication procedure, and a NAS security control procedure based on the registration request received in step S621 (S625).

In step S625, the identification procedure (e.g. step S322 illustrated in FIG. 3) may include a step in which the core network (e.g. AMF) transmits an identity request to the terminal and a step in which the terminal transmits an identity response to the core network. The authentication procedure (e.g. step S323 illustrated in FIG. 3) may include a step in which the core network transmits an authentication request to the terminal and a step in which the terminal transmits an authentication response to the core network. The NAS security control procedure (e.g. step S324 illustrated in FIG. 3) may include a step in which the core network transmits a security mode command to the terminal and a step in which the terminal transmits a security mode complete to the core network. If the NAS security control procedure between the terminal and the core network is successfully completed, step S627 may be performed.

In step S627, an AS security control procedure may be performed between the terminal and the TN base station. If the AS security procedure between the terminal and the base station is successfully completed, step 629 may be performed.

In step S629, the terminal may receive a registration accept indicating that the registration request is accepted from the core network (e.g. AMF), and the terminal may perform step S630. The registration accept may include dual-steering support information (e.g. DS_Supported information) indicating whether the core network supports dual-steering.

In step S630, the terminal may identify whether the core network supports dual-steering based on the registration accept received in the first access registration procedure (S620).

In an exemplary embodiment, the registration accept received from the core network may not include the dual-steering support information (e.g. DS_Supported information). If the registration accept does not include the dual-steering support information, it may be determined that the core network does not support dual-steering.

In another exemplary embodiment, the registration accept received from the core network may include the dual-steering support information (e.g. DS_Supported information). If the dual-steering support information indicates that the core network does not support dual-steering (e.g. DS_Supported information indicates 'false'), it may be determined that the core network does not support dual-steering.

In yet another exemplary embodiment, the registration accept received from the core network may include the dual-steering support information (e.g. DS_Supported information). If the dual-steering support information indicates that the core network supports dual-steering (e.g. DS_Supported information indicates 'true'), it may be determined that the core network supports dual-steering.

In yet another exemplary embodiment, the registration accept received from the core network may include the dual-steering support information (e.g. DS_Supported information). If the dual-steering support information is included, it may be determined that the core network supports dual-steering.

Although steps S610 to S630 have been described individually, this is not intended to limit the order in which the steps are performed. If necessary, the respective steps may be performed simultaneously, in a different order, or combined.

If the terminal determines that the core network supports dual-steering in step S630, the terminal may access the NTN cell and perform an additional registration procedure.

Figure 7:
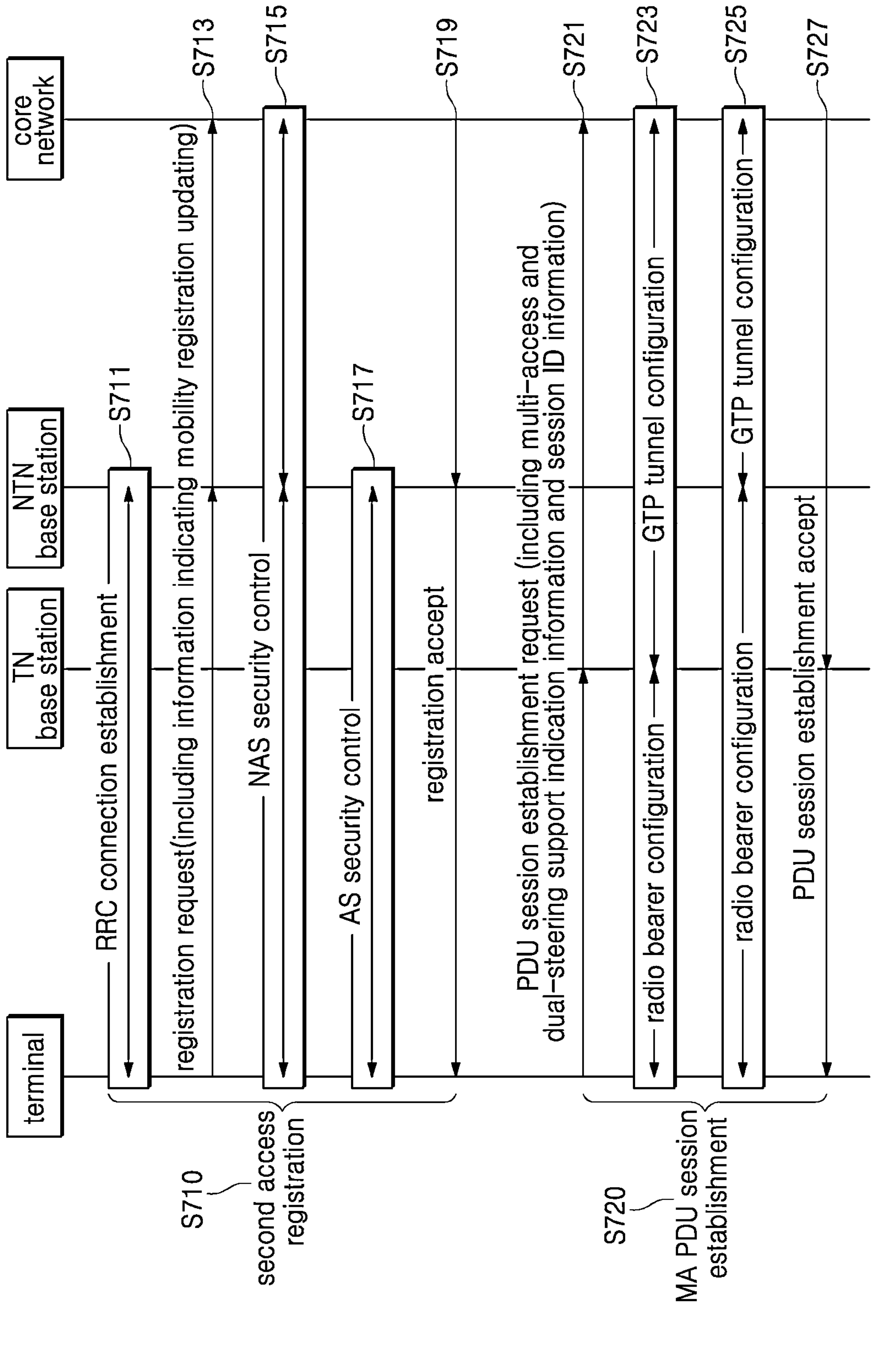
FIG. 7 is a sequence chart illustrating a second process for describing a registration method and a PDU session establishment method when using both a TN cell and an NTN cell belonging to a home PLMN according to exemplary embodiments of the present disclosure.

FIG. 7 is a sequence chart illustrating a second process for describing a registration method and a PDU session establishment method when using both a TN cell and an NTN cell belonging to a home PLMN according to exemplary embodiments of the present disclosure.

Referring to FIG. 7, a communication system may include a terminal, a TN base station, an NTN base station, and a core network. The terminal may be the terminal 531 illustrated in FIG. 5. The TN base station may be the TN base station 541 illustrated in FIG. 5. The NTN base station may be the NTN base station 542 illustrated in FIG. 5. The core network may be the core network 551 illustrated in FIG. 5. The terminal, the TN base station, and the NTN base station may be configured identically or similarly to the communication node illustrated in FIG. 2. When the terminal is able to use both the TN cell and the NTN cell belonging to the home PLMN, the terminal may access the TN base station and perform terminal registration with the core network. It may be assumed that the TN base station and the NTN base station belong to the home PLMN. It may be assumed that the terminal performs the initial registration procedure by giving priority to the TN cell access. It may be assumed that the terminal has successfully performed the first process illustrated in FIG. 6 and confirmed that the core network supports dual-steering. As described above, the TN base station may be expressed as a TN base station cell or TN cell, and the NTN base station may be expressed as an NTN base station cell or NTN cell.

If the terminal performs the first process illustrated in FIG. 6 and confirms that the core network supports dual-steering, the terminal may perform an additional registration procedure through the NTN cell. The additional registration procedure through the NTN cell may refer to a second access registration procedure S710 illustrated in FIG. 7.

In step S710, the terminal may perform an RRC connection establishment procedure with the NTN base station (S711). After the RRC connection establishment procedure between the terminal and the NTN base station is successfully completed, the terminal may transmit a registration request to the core network (e.g. AMF). The core network (e.g. AMF) may receive the registration request from the terminal, and the registration request may include information indicating mobility registration updating (S713). The core network may perform a NAS security control procedure based on the registration request received in step S713 (S715). If the NAS security control procedure between the terminal and the core network is successfully performed, an AS security control procedure between the terminal and the NTN base station may be performed (S717). Then, the terminal may receive a registration accept in response to the registration request from the core network (S719).

In step S715, the identification procedure and authentication procedure already performed by the terminal in the first process as illustrated in FIG. 6 may be omitted. Accordingly, additional signaling between the terminal and NTN base station may be minimized.

In step S719, if the terminal successfully completes steps S715 and S717, the terminal may receive a registration accept in response to the registration request including information indicating the mobility registration updating transmitted in step S713 from the core network (e.g. AMF). If the terminal receives the registration accept in response to the registration request including information indicating the mobility registration updating, the terminal may perform a multiple access (MA) PDU session establishment procedure (step S720) to establish (or configure) PDU sessions by dual-steering with the core network (e.g. AMF). The MA PDU session establishment procedure may be performed through the TN base station.

In step S720, the terminal may transmit a PDU session establishment request (hereinafter, MA PDU establishment request) including information indicating an MA PDU session by dual-steering (e.g. MA_PDU_SESSION_DS flag) and/or session identifier (ID) information to the core network (e.g. SMF). The core network may receive the MA PDU session establishment request from the terminal (S721). The core network may perform a resource configuration procedure for the terminal with respect to each of the TN base station and the NTN base station based on the MA PDU session establishment request received from the terminal. In the resource configuration procedure for the terminal, a GTP tunnel may be configured between the TN base station and the core network, and a radio bearer may be configured between the terminal and the TN base station (S723). A GTP tunnel may be configured between the NTN base station and the core network, and a radio bearer may be configured between the terminal and the NTN base station (S725). Then, the core network may transmit a PDU session establishment accept to the terminal in response to the MA PDU session establishment request. The terminal may receive the PDU session establishment accept in response to the MA PDU session establishment request from the core network (S727).

If the terminal receives the PDU session establishment accept in response to the MA PDU session establishment request from the core network in step S727, an MA PDU session by dual-steering between the terminal and the core network may be established. If the MA PDU session by dual-steering between the terminal and the core network is established, the terminal may further perform a step of communicating with the core network through the established MA PDU session. The communication between the terminal and the core network may include a step of performing data communication and/or control data communication. The data communication between the terminal and the core network may be expressed as traffic data communication between the terminal and the core network. The data communication between the terminal and the core network may be performed through the TN base station and/or the NTN base station.

Although steps S710 to S727 have been described individually, this is not intended to limit the order in which the steps are performed. If necessary, the respective steps may be performed simultaneously, in a different order, or combined.

If the terminal determines that the core network does not support dual-steering during the initial registration process (e.g. first access registration procedure (step S620) illustrated in FIG. 6), the terminal may not perform the additional registration procedure through the NTN base station. The terminal may perform a single access (SA) PDU session establishment procedure.

Figure 8:
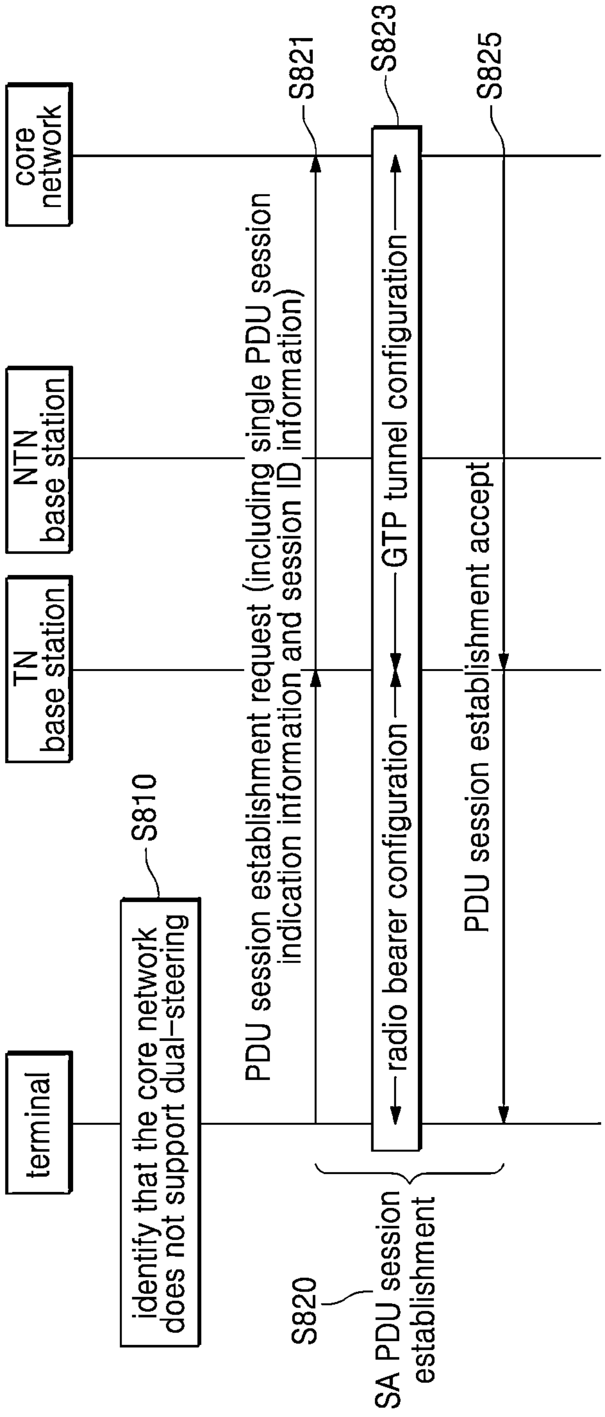
FIG. 8 is a sequence chart illustrating a third process for describing a registration method and a PDU session establishment method when using both a TN cell and NTN cell belonging to a home PLMN according to exemplary embodiments of the present disclosure.

FIG. 8 is a sequence chart illustrating a third process for describing a registration method and a PDU session establishment method when using both a TN cell and NTN cell belonging to a home PLMN according to exemplary embodiments of the present disclosure.

Referring to FIG. 8, a communication system may include a terminal, a TN base station, an NTN base station, and a core network. The terminal may be the terminal 531 illustrated in FIG. 5. The TN base station may be the TN base station 541 illustrated in FIG. 5. The NTN base station may be the NTN base station 542 illustrated in FIG. 5. The core network may be the core network 551 illustrated in FIG. 5. The terminal, the TN base station, and the NTN base station may be configured identically or similarly to the communication node illustrated in FIG. 2. If the terminal is able to utilize both the TN cell and the NTN cell belonging to the home PLMN, the terminal may access the TN base station and perform terminal registration with the core network. It may be assumed that the TN base station and the NTN base station belong to the home PLMN. It may be assumed that the terminal performs initial registration by giving priority to the TN cell access. The terminal may successfully perform the first process illustrated in FIG. 6 to confirm that the core network does not support dual-steering (dual-steering not supported). If it is determined that the core network does not support dual-steering, the terminal may perform an SA PDU session establishment procedure to establish an SA PDU session with the core network. As described above, the TN base station may be expressed as a TN base station cell or TN cell, and the NTN base station may be expressed as an NTN base station cell or NTN cell.

In step S810, the terminal may perform initial registration, and the terminal may determine whether to perform the SA PDU session establishment procedure according to a result of the initial registration.

The terminal may perform the first process (e.g. steps S610 to S630) illustrated in FIG. 6 to confirm whether the core network (e.g. AMF) supports dual-steering. If it is determined that the core network supports dual-steering, the terminal may perform the second process (e.g. steps S710 to S727) as illustrated in FIG. 7. If it is determined that the core network does not support dual-steering (dual-steering not supported), the terminal may perform step S820 to perform the SA PDU session establishment procedure.

If it is determined that the core network does not support dual-steering in step S820, the terminal may not perform an additional registration procedure through the NTN base station (e.g. the second access registration procedure (step S710) illustrated in FIG. 7). If the terminal initiates a PDU session establishment procedure with the core network, the terminal may transmit a PDU session establishment request (hereinafter, SA PDU session establishment request) including single PDU session indication information and session ID information to the core network. The core network may receive the SA PDU session establishment request from the terminal. The SA PDU session establishment request may be transmitted and received between the terminal and the core network through the TN base station (S821). The core network may perform a resource configuration procedure for the terminal based on the SA PDU session establishment request received from the terminal. In the resource configuration procedure for the terminal, a GTP tunnel may be configured between the TN base station and the core network, and a radio bearer may be configured between the terminal and the TN base station (S823). Then, if the resource configuration procedure for the terminal is successfully performed, the core network may transmit a PDU session establishment accept to the terminal in response to the SA PDU session establishment request. The terminal may receive the PDU session establishment accept in response to the SA PDU session establishment request from the core network (S825).

As illustrated in FIG. 8, the SA PDU session establishment request and the PDU session establishment accept may be transmitted and received between the terminal and the core network through the TN base station.

If a single PDU session is established between the terminal and the core network, the terminal may further perform a step of performing data communication with the core network through the established single PDU session. The communication between the terminal and the core network may include a step of performing data communication and/or control data communication. The data communication between the terminal and the core network may be expressed as traffic data communication between the terminal and the core network.

Although steps S810 to S825 have been described individually, this is not intended to limit the order in which the steps are performed. If necessary, the respective steps may be performed simultaneously, in a different order, or combined.

[Method 2] Method for Terminal Registration and PDU Session Establishment Using a TN Cell and NTN Cell Belonging to Home PLMN Sequentially Hereinafter, a method for terminal registration and PDU session establishment using a TN cell and an NTN cell belonging to a home PLMN sequentially (hereinafter, Method 2) will be described. In Method 2, the terminal may be able to use only one of the TN base station or NTN base station. When the terminal camps on the TN cell, the terminal may access the TN base station and perform terminal registration and PDU session establishment procedures with the core network. Thereafter, when the terminal camps on the NTN cell due to movement of the terminal, the terminal may access the NTN base station and perform terminal registration and PDU session establishment procedures with the core network. The terminal may camp on the NTN cell after camping on the TN cell. The terminal may use the TN base station and the NTN base station simultaneously. When the terminal departs from a cell coverage of one of the TN base station and the NTN base station, the terminal may only use a base station other than the one of the TN base station and the NTN base station. As described above, the TN base station may be expressed as a TN base station cell or TN cell, and the NTN base station may be expressed as an NTN base station cell or NTN cell.

Figure 9:
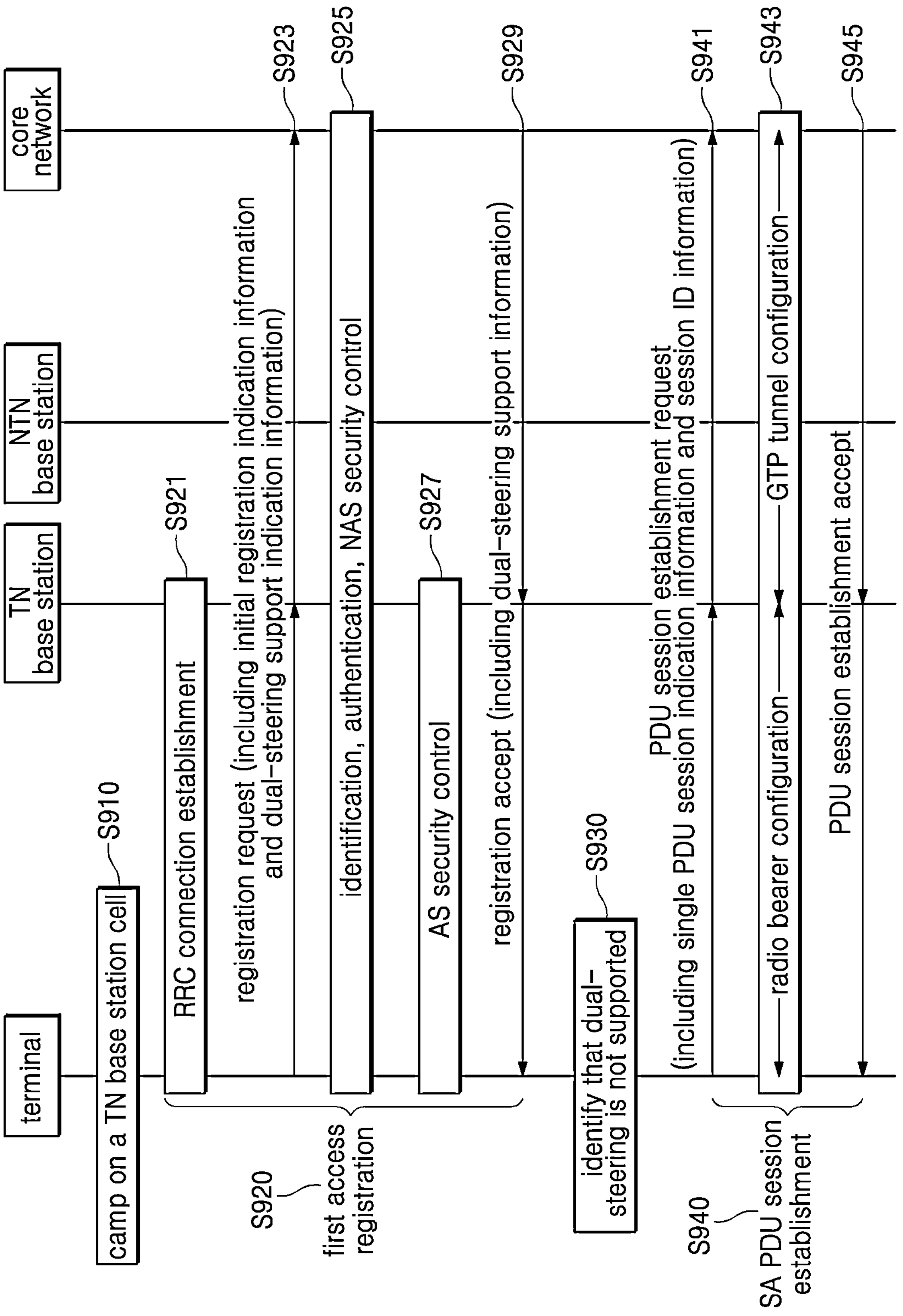
FIG. 9 is a sequence chart illustrating a first process for describing a registration method and a PDU session establishment method when using a TN cell and NTN cell belonging to a home PLMN sequentially according to exemplary embodiments of the present disclosure.

FIG. 9 is a sequence chart illustrating a first process for describing a registration method and a PDU session establishment method when using a TN cell and NTN cell belonging to a home PLMN sequentially according to exemplary embodiments of the present disclosure.

Referring to FIG. 9, a communication system may include a terminal, a TN base station, an NTN base station, and a core network. The terminal may be the terminal 531 illustrated in FIG. 5. The TN base station may be the TN base station 541 illustrated in FIG. 5. The NTN base station may be the NTN base station 542 illustrated in FIG. 5. The core network may be the core network 551 illustrated in FIG. 5. The terminal, the TN base station, and the NTN base station may be configured identically or similarly to the communication node illustrated in FIG. 2. When the TN cell and the NTN cell belonging to the home PLMN of the terminal are sequentially available to the terminal, the terminal may access the TN base station and perform terminal registration with the core network. It may be assumed that the TN base station and the NTN base station belong to the home PLMN. It may be assumed that the terminal performs initial registration by giving priority to the TN cell access. The terminal may perform a first access registration procedure for initial registration, and may use a result of performing the first access registration procedure to identify whether the core network supports dual-steering. If it is determined that the core network does not support dual-steering, the terminal may initiate a single PDU session establishment procedure with the core network. As described above, the TN base station may be expressed as a TN base station cell or TN cell, and the NTN base station may be expressed as an NTN base station cell or NTN cell.

In step S910, when the terminal is powered on, the terminal may search for the TN cell and the NTN cell, and the terminal may camp on only one of the TN cell or the NTN cell. The terminal may perform a first access registration procedure (step S920) to perform an initial registration procedure in the TN cell.

In step S920, the terminal may perform an RRC connection establishment procedure with the TN base station (S921). After the RRC connection establishment procedure between the terminal and the TN base station is successfully completed, the terminal may transmit a registration request to the core network (e.g. AMF). The core network (e.g. AMF) may receive the registration request from the terminal. The registration request may include a registration type information indicating initial registration and dual-steering capability (or support) information (e.g. DS_Capable information) indicating that the terminal supports dual-steering (S923). The core network may perform an identification procedure, an authentication procedure, and a NAS security control procedure based on the registration request received in step S921 (S925). If the identification procedure, the authentication procedure, and the NAS security control procedure between the terminal and the core network are successfully completed, an AS security control procedure between the terminal and the TN base station may be performed (S927). Then, if the AS security procedure between the terminal and the base station is successfully completed, the terminal may receive a registration accept indicating that the registration request is accepted from the core network (e.g. AMF) (S929). The registration accept received in step S929 may include dual-steering support information (e.g. DS_Supported information) indicating whether the core network supports dual-steering. The terminal may perform step S930.

In step S930, the terminal may identify that the core network does not support dual-steering based on the registration accept received from the core network in step S929. If the terminal identifies that the core network does not support dual-steering, the terminal may perform step S940 to establish an SA PDU session with the core network.

In step S940, the terminal may transmit an SA PDU session establishment request to the core network. The core network may receive the SA PDU session establishment request from the terminal. The SAPDU session establishment request may be transmitted and received between the terminal and the core network through the TN base station (S941). The core network may perform a resource configuration procedure for the terminal based on the SA PDU session establishment request received from the terminal. In the resource configuration procedure for the terminal, a GTP tunnel may be configured between the TN base station and the core network, and a radio bearer may be configured between the terminal and the TN base station (S943). If the resource configuration procedure for the terminal is successfully performed, the core network may transmit a PDU session establishment accept to the terminal in response to the SA PDU session establishment request. The terminal may receive the PDU session establishment accept in response to the SA PDU session establishment request from the core network (S945).

As illustrated in FIG. 9, the SA PDU session establishment request and the PDU session establishment accept may be transmitted and received between the terminal and the core network through the TN base station.

If a single PDU session is established between the terminal and the core network, the terminal may further perform a step of performing communication with the core network through the established single PDU session.

Although steps S910 to S945 have been described individually, this is not intended to limit the order in which the steps are performed. If necessary, the respective steps may be performed simultaneously, in a different order, or combined.

Figure 10:
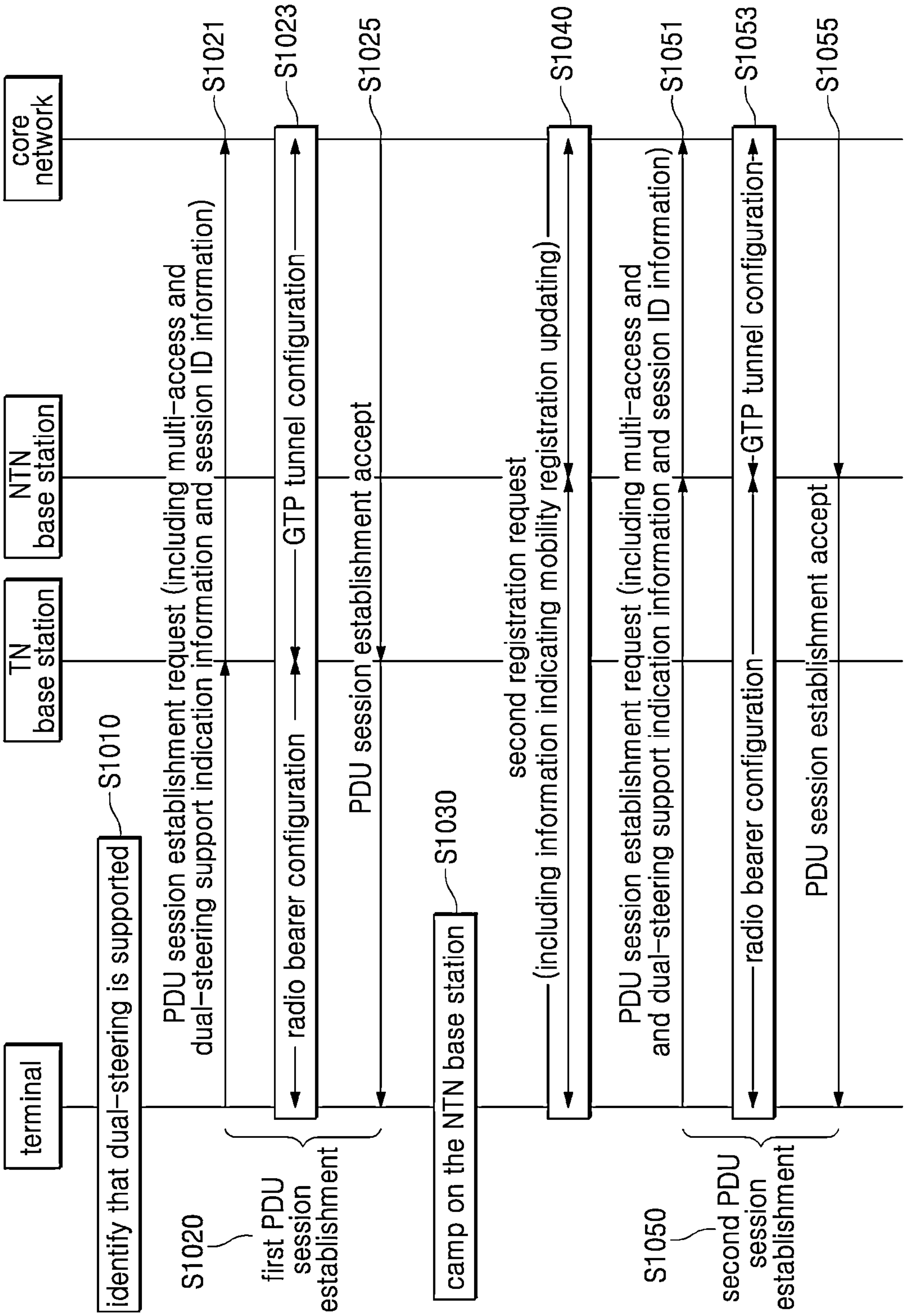
FIG. 10 is a sequence chart illustrating a second process for describing a registration method and a PDU session establishment method when sequentially using a TN cell and NTN cell belonging to a home PLMN according to exemplary embodiments of the present disclosure.

FIG. 10 is a sequence chart illustrating a second process for describing a registration method and a PDU session establishment method when sequentially using a TN cell and NTN cell belonging to a home PLMN according to exemplary embodiments of the present disclosure.

Referring to FIG. 10, a communication system may include a terminal, a TN base station, an NTN base station, and a core network. The terminal may be the terminal 531 illustrated in FIG. 5. The TN base station may be the TN base station 541 illustrated in FIG. 5. The NTN base station may be the NTN base station 542 illustrated in FIG. 5. The core network may be the core network 551 illustrated in FIG. 5. The terminal, the TN base station, and the NTN base station may be configured identically or similarly to the communication node illustrated in FIG. 2. When the TN cell and the NTN cell belonging to the home PLMN are sequentially available to the terminal, the terminal may access the TN base station and perform terminal registration with the core network. It may be assumed that the TN base station and the NTN base station belong to the home PLMN. The terminal may search for the TN cell and/or the NTN cell, and the terminal may be able to camp on only one of the TN cell and/or the NTN cell. It may be assumed that the terminal performs an initial registration procedure by giving priority to the TN cell access. The terminal may perform a first access registration procedure for the initial registration procedure, and may identify whether the core network supports dual-steering base on a result of performing the first access registration procedure. If it is determined that the core network supports dual-steering, the terminal may camp on the NTN base station cell and perform a second registration request. If the second registration request is successfully performed, the terminal may perform a second PDU session establishment procedure. Only one of the TN base station or the NTN base station may be available to the terminal. After the terminal performs the camping-on, registration, and PDU session establishment procedures with the TN base station, the terminal may camp on the NTN base station.

In step S1010, the terminal may perform a first access registration procedure (e.g. steps S921 to S929) as illustrated in FIG. 9 to confirm that the core network supports dual-steering. If it is determined that the core network supports dual-steering, the terminal may perform step S1020 (i.e. first PDU session establishment procedure) to establish a first PDU session among MA PDU sessions with the core network.

In step S1020, the terminal may transmit an MA PDU establishment request to the core network (e.g. SMF). The core network may receive the MA PDU session establishment request from the terminal (S1021). The core network may perform a resource configuration procedure for the terminal with respect to the TN base station based on the MA PDU session establishment request received from the terminal. In the resource configuration procedure for the terminal, a GTP tunnel may be configured between the TN base station and the core network, and a radio bearer may be configured between the terminal and the TN base station (S1023). Then, the core network may transmit a PDU session establishment accept to the terminal in response to the MA PDU session establishment request. The terminal may receive the PDU session establishment accept in response to the MA PDU session establishment request from the core network (S1025). If the PDU session establishment accept is received in response to the MA PDU establishment request, the terminal may perform step S1030.

In step S1030, the terminal may camp on the NTN cell belonging to a second access network (e.g. NTN-RAN). If the terminal camps on the NTN cell, the terminal may perform step S1040 to perform an additional registration procedure through the NTN base station.

In step S1040, the terminal may transmit a registration request including information indicating mobility registration updating to the core network. The core network may receive the registration request including information indicating mobility registration updating from the terminal. The core network may transmit a registration accept to the terminal in response to the registration request including information indicating mobility registration updating received from the terminal. The terminal may receive the registration accept in response to the registration request including information indicating mobility registration updating from the core network. If the terminal receives the registration accept in step S1040, the terminal may perform step S1050 (i.e. second PDU session establishment procedure) to establish a second PDU session among MA PDU sessions with the core network.

If an additional registration procedure is performed through the NTN base station between the terminal and the core network, step S1040 may be performed. In step S1040, a second access registration procedure (e.g. steps S711 to S719) as illustrated in FIG. 7 may be performed. In step S1040, an identification procedure (e.g. step S322 illustrated in FIG. 3) and an authentication procedure (e.g. step S323 illustrated in FIG. 3) between the terminal and the core network may be omitted. That is, only a NAS security control procedure between the terminal and the core network may be performed.

In step S1050, the terminal may transmit a second MA PDU session request to the core network (e.g. SMF). The core network may receive the second MA PDU session request from the terminal (S1051). The core network may perform a resource configuration procedure for the terminal based on the second MA PDU session request received in step S1051 (S1053). Then, the core network may transmit a second PDU session establishment accept to the terminal in response to the MA PDU session establishment request. The terminal may receive the PDU session establishment accept in response to the MA PDU session establishment request from the core network (S1055).

In step S1050, the second MA PDU session request and the second registration accept may be transmitted and received through the NTN base station The session ID information included in the second MA PDU session request in step S1051 may be the same information as the session ID information included in the first MA PDU session request in step S1020.

In step S1053, the resource configuration procedure for the terminal may include a radio bearer configuration procedure between the terminal and the NTN base station and a GTP tunnel configuration procedure between the NTN base station and the core network.

If the MA PDU session is established by dual-steering between the terminal and the core network, the terminal may further perform a step of performing communication with the core network through the established MA PDU session. The communication between the terminal and the core network may include a step of performing data communication and/or control data communication. The data communication between the terminal and the core network may be expressed as traffic data communication between the terminal and the core network.

In an exemplary embodiment, the terminal may camp on the TN cell among the TN cell or the NTN cell. As the terminal moves, the terminal may depart from a coverage of the TN base station, and the terminal may camp on the NTN cell.

The terminal may access the TN base station and perform terminal registration and PDU session establishment procedures with the core network. When the MA PDU session by dual-steering between the terminal and the core network is established through the TN base station, communication between the terminal and the core network may be performed through the TN base station.

The terminal may depart from the coverage of the TN base station due to movement of the terminal. When the terminal is included in the coverage of the NTN base station, the terminal may camp on the NTN cell. The terminal may access the NTN base station and perform terminal registration and PDU session establishment procedures with the core network. When the MA PDU session by dual-steering between the terminal and the core network is established through the NTN base station, communication between the terminal and the core network may be performed through the NTN base station. Communication between the terminal and the core network using (or through) the TN base station may be deactivated.

Although steps S1010 to S1055 have been described individually, this is not intended to limit the order in which the steps are performed. If necessary, the respective steps may be performed simultaneously, in a different order, or combined.

[Method 3] Method for Terminal Registration and PDU Session Establishment Using a TN Cell and NTN Cell Belonging to Different PLMNs Hereinafter, a method for terminal registration and PDU session establishment sequentially using a TN cell and NTN cell belonging to different PLMNs (hereinafter, referred to as Method 3) will be described. In Method 3, the TN base station may be a base station belonging to a home PLMN, and the NTN base station may be a base station belonging to a visited PLMN. When the terminal is powered on, the terminal may perform an initial registration procedure with the core network. At the time when the terminal performs the initial registration procedure, both the TN base station and the NTN base station may be available or only one base station may be available. It may be assumed that one of the TN base station and the NTN base station belongs to the home PLMN. If both the TN base station and the NTN base station are available to the terminal, the terminal may preferentially perform the initial registration procedure through the base station belonging to the home PLMN. If only one of the TN base station or the NTN base station is available to the terminal, the terminal may perform the initial registration procedure through the corresponding base station.

Figure 11:
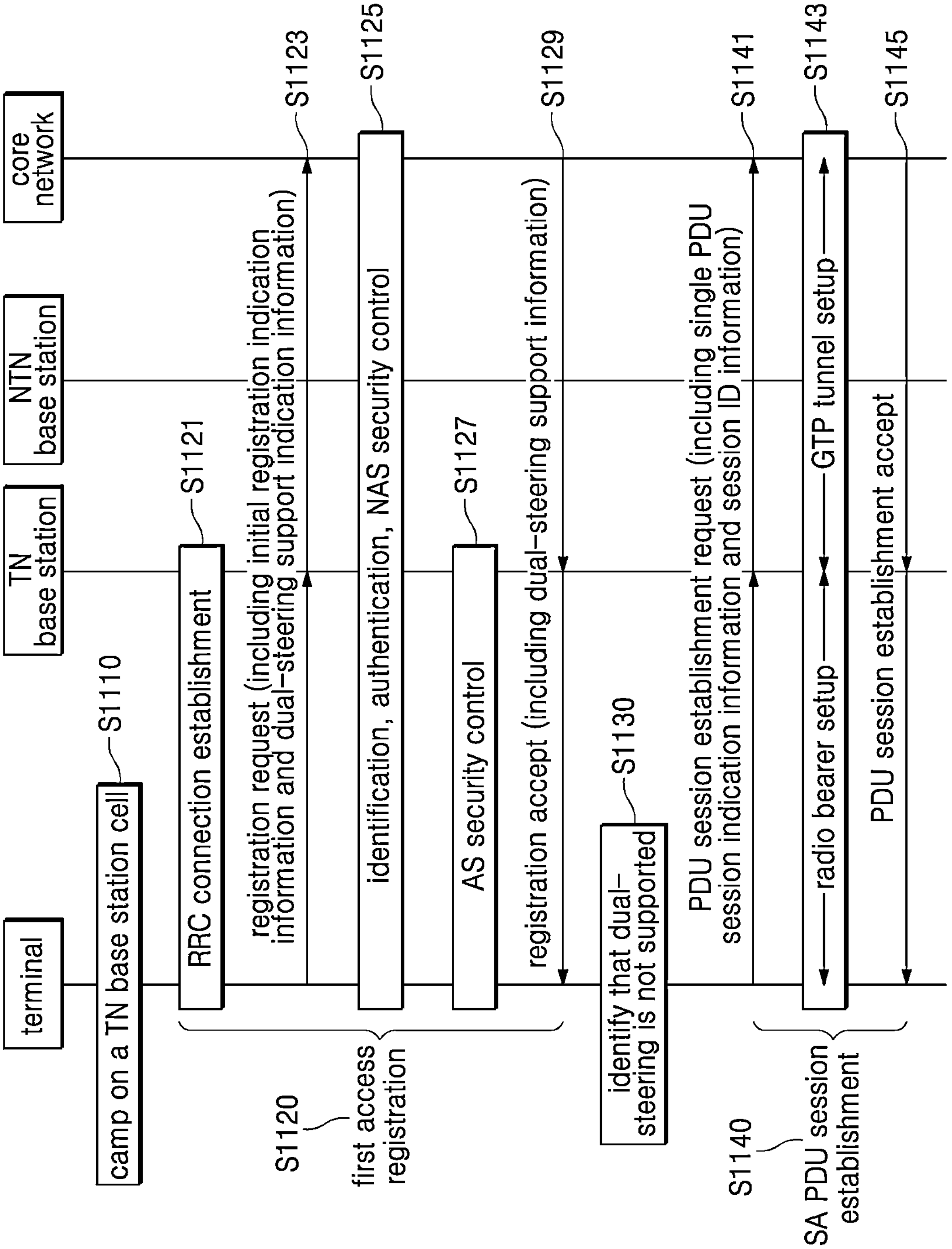
FIG. 11 is a sequence chart illustrating a first process for describing a registration method and a single PDU session establishment method when using a TN cell and NTN cell belonging to different PLMNs according to exemplary embodiments of the present disclosure.

FIG. 11 is a sequence chart illustrating a first process for describing a registration method and a single PDU session establishment method when using a TN cell and NTN cell belonging to different PLMNs according to exemplary embodiments of the present disclosure.

Referring to FIG. 11, a communication system may include a terminal, a TN base station, an NTN base station, and a core network. The terminal may be the 532 illustrated in FIG. 5. The TN base station may be the TN base station 543 illustrated in FIG. 5. The NTN base station may be the NTN base station 542 illustrated in FIG. 5. The core network may be the core network 551 or 552 illustrated in FIG. 5. The terminal, the TN base station, and the NTN base station may be configured identically or similarly to the communication node illustrated in FIG. 2. When the terminal is powered on, it may be assumed that one of the TN cell or the NTN cell belongs to a home PLMN, and the other cell belongs to a visited PLMN. If both the TN cell and NTN cell are available to the terminal, the terminal may perform an initial registration procedure by giving priority to access to a cell belonging to the home PLMN or the TN cell. If only the TN cell is available, the initial registration procedure may be performed through the TN access. The TN access in the communication system may be provided to the terminal through the TN base station (e.g. TN base station 541 and TN base station 543 illustrated in FIG. 5). As described above, the TN base station may be expressed as a TN base station cell or TN cell, and the NTN base station may be expressed as an NTN base station cell or NTN cell.

In step S1110, when the terminal is powered on, the terminal may camp on the TN base station cell. The terminal may perform a first access registration procedure (step S1120) to perform an initial registration procedure in the TN cell.

In an exemplary embodiment, it may be assumed that the TN base station cell belongs to a home PLMN and the NTN base station cell belongs to a visited PLMN. When the terminal is powered on, if the terminal uses both the TN base station cell and the NTN base station cell, the terminal may camp on the TN base station cell with priority given to the home PLMN.

In another exemplary embodiment, it may be assumed that the TN base station belongs to a home PLMN and the NTN base station cell belongs to the visited PLMN. When the terminal is powered on, the terminal may use only the TN base station cell among the TN base station cell or the NTN base station cell.

In step S1120, the terminal may perform an RRC connection establishment procedure with the TN base station (S1121). After the RRC connection establishment procedure between the terminal and the TN base station is successfully completed, the terminal may transmit a registration request to the core network (e.g. AMF). The core network (e.g. AMF) may receive the registration request from the terminal, and the registration request may include a registration type information indicating initial registration and dual-steering capability information (e.g. DS_Capable information) indicating that the terminal supports dual-steering (S1123). The core network may perform an identification procedure, an authentication procedure, and a NAS security control procedure based on the registration request received in step S1121 (S1125). If the identification procedure, the authentication procedure, and the NAS security control procedure between the terminal and the core network are successfully completed, an AS security control procedure between the terminal and the TN base station may be performed (S1127). Then, if the AS security procedure between the terminal and the base station is successfully completed, the terminal may receive a registration accept indicating that the registration request is accepted from the core network (e.g. AMF) (S1129). The registration accept received in step S1129 may include dual-steering support information (e.g. DS_Supported information) indicating whether the core network supports dual-steering. The terminal may perform step S1130.

In step S1130, the terminal may confirm that the core network does not support dual-steering based on the registration accept received from the core network in step S1129. If it is determined that the core network does not support dual-steering, the terminal may perform step S1140 to establish an SA PDU session with the core network.

In an exemplary embodiment, the registration accept received from the core network may not include dual-steering support information (e.g. DS_Supported information). If the registration accept does not include the dual-steering support information, it may be determined that the core network does not support dual-steering.

In another exemplary embodiment, the registration accept received from the core network may include the dual-steering support information (e.g. DS_Supported information). If the dual-steering support information indicates that the core network does not support dual-steering (e.g. DS_Supported information indicates 'false'), it may be determined that the core network does not support dual-steering.

In step S1140, if it is determined that dual-steering is not supported, the terminal may transmit an SA PDU session establishment request to the core network. The core network may receive the SA PDU session establishment request from the terminal. The SA PDU session establishment request may be transmitted and received between the terminal and the core network through the TN access (S1141). The core network may perform a resource configuration procedure for the terminal based on the SA PDU session establishment request received from the terminal (S1143). If the resource configuration procedure for the terminal is successfully performed, the core network may transmit a PDU session establishment accept to the terminal in response to the SA PDU session establishment request. The terminal may receive the PDU session establishment accept in response to the SA PDU session establishment request from the core network (S1145).

As illustrated in FIG. 11, the SA PDU session establishment request and the PDU session establishment accept may be transmitted and received between the terminal and the core network through the TN base station.

If a single PDU session is established between the terminal and the core network, the terminal may further perform a step of performing communication with the core network through the established single PDU session.

Although steps S1110 to S1145 have been described individually, this is not intended to limit the order in which the steps are performed. If necessary, the respective steps may be performed simultaneously, in a different order, or combined.

Figure 12:
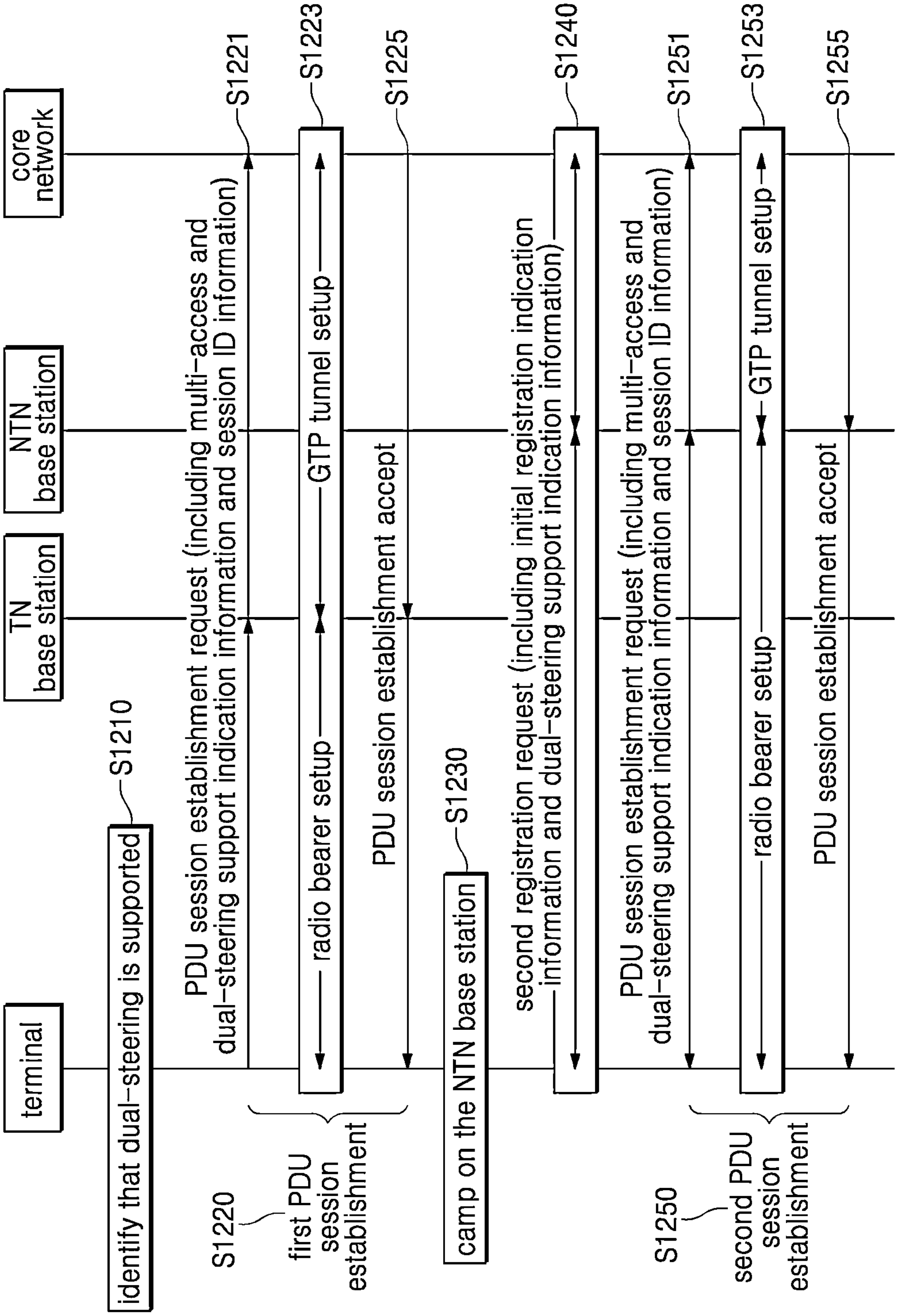
FIG. 12 is a sequence chart illustrating a second process for describing a registration method and a single PDU session establishment method when using a TN cell and an NTN cell belonging to different PLMNs according to exemplary embodiments of the present disclosure.

FIG. 12 is a sequence chart illustrating a second process for describing a registration method and a single PDU session establishment method when using a TN cell and an NTN cell belonging to different PLMNs according to exemplary embodiments of the present disclosure.

Referring to FIG. 12, a communication system may include a terminal, a TN base station, an NTN base station, and a core network. The terminal may be the terminal 532 illustrated in FIG. 5. The TN base station may be the TN base station 543 illustrated in FIG. 5. The NTN base station may be the NTN base station 542 illustrated in FIG. 5. The core network may be the core network 551 or 552 illustrated in FIG. 5. The terminal, the TN base station, and the NTN base station may be configured identically or similarly to the communication node illustrated in FIG. 2. If both the TN cell belonging to a home PLMN and the NTN cell are available to the terminal, the terminal may access the TN base station to perform terminal registration between the terminal and the core network. It may be assumed that the TN base station belongs to the home PLMN and the NTN base station belongs to a visited PLMN. The terminal may search for the TN cell and/or NTN cell, and the terminal may camp on only one of the TN cell and/or NTN cell. It may be assumed that the terminal performs initial registration by giving priority to accessing a cell belonging to the home PLMN or the TN cell. The terminal may perform a first access registration procedure for initial registration, and may check whether the core network supports dual-steering based on a result of performing the first access registration procedure. If it is identified that the core network supports dual-steering, the terminal may camp on the NTN base station cell and perform a second registration request. If the second registration request is successfully performed, the terminal may perform a second PDU session establishment procedure.

In step S1210, the terminal may perform a first access registration procedure (e.g. step S1120) as illustrated in FIG. 11 to check whether the core network supports dual-steering. If it is confirmed that the core network supports dual-steering, the terminal may perform step S1220 (i.e. first PDU session establishment procedure) to establish a first PDU session among the MA PDU sessions with the core network.

In step S1220, the terminal may transmit an MA PDU establishment request to the core network (e.g. SMF). The core network may receive the MA PDU session establishment request from the terminal (S1221). The core network may perform a resource configuration procedure for the terminal with respect to TN access based on the MA PDU session establishment request received from the terminal (S1223). Then, the core network may transmit a PDU session establishment accept to the terminal in response to the MA PDU session establishment request. The terminal may receive the PDU session establishment accept in response to the MA PDU session establishment request from the core network (S1225). If the PDU session establishment accept is received in response to the MA PDU establishment request, the terminal may perform step S1230.

In step S1230, the terminal may camp on the NTN cell belonging to a second access. If the terminal camps on the NTN cell, the terminal may perform step S1240 to perform an additional registration procedure through the NTN base station.

In step S1240, the terminal may transmit a registration request including information indicating mobility registration updating to the core network. The core network may receive the registration request including information indicating mobility registration updating from the terminal. The core network may transmit a registration accept to the terminal in response to the registration request including information indicating mobility registration updating received from the terminal. The terminal may receive the registration accept in response to the registration request including information indicating mobility registration updating from the core network. If the terminal receives the registration accept in step S1240, the terminal may perform step S1250 (i.e. second PDU session establishment procedure) to establish a second PDU session among MA PDU sessions with the core network.

If an additional registration procedure is performed through the NTN base station between the terminal and the core network, step S1240 may be performed. In step S1240, a second access registration procedure may be performed. If the terminal accesses the TN base station and the NTN base station belonging to the same PLMN, in step S1240, an identification procedure between the terminal and the core network and an authentication procedure between the terminal and the core network may be omitted. In step S1240, only a NAS security procedure between the terminal and the core network may be performed. In step S1240, if the terminal accesses the TN base station and the NTN base station belonging to different PLMNs, an identification procedure between the terminal and the core network, an authentication procedure between the terminal and the core network, and a NAS security procedure between the terminal and the core network may be performed.

In step S1250, the terminal may transmit a second MA PDU session request to the core network (e.g. SMF). The core network may receive the second MA PDU session request from the terminal (S1251). The core network may perform a resource configuration procedure for the terminal based on the second MA PDU session request received in step S1251 (S1253). Then, the core network may transmit a second PDU session establishment accept to the terminal in response to the second MA PDU session establishment request. The terminal may receive the second MA PDU session establishment accept in response to the second MA PDU session establishment request from the core network (S1255).

In step S1250, the second MA PDU session request and the second MA PDU session establishment accept may be transmitted and received through the NTN base station.

The session ID information included in the second MA PDU session request in step S1251 may be the same information as the session ID information included in the first MA PD U session request in step S1220.

In step S1253, the resource configuration procedure for the terminal may include a radio bearer setup procedure between the terminal and the NTN base station and a GTP tunnel setup procedure between the NTN base station and the core network. As described above, the radio bearer setup procedure may mean a radio bearer configuration procedure, and the GTP tunnel setup procedure may mean a GTP tunnel configuration procedure.

If a MA PDU session is established by dual-steering between the terminal and the core network, the terminal may further perform a step of performing communication with the core network through the established MA PDU session.

Although steps S1210 to S1255 have been described individually, this is not intended to limit the order in which the steps are performed. If necessary, the respective steps may be performed simultaneously, in a different order, or combined.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:
- selecting one of a terrestrial network (TN) base station or a non-terrestrial network (NTN) base station as a first base station;
- performing a first access registration procedure between the terminal and a core network through the first base station;
- identifying whether the core network supports dual-steering, based on a result of the first access registration procedure;
- in response to identifying that the core network supports dual-steering, performing a second access registration procedure between the terminal and the core network through a second base station other than the first base station among the TN base station or the NTN base station; and
- in response to a success of the second access registration procedure, performing a multiple access (MA) protocol data unit (PDU) session establishment procedure according to dual-steering through the first base station.

2. The method according to claim 1, wherein the TN base station and the NTN base station are base stations belonging to a home public land mobile network (PLMN), and when an access priority of the TN base station is higher than an access priority of the NTN base station, the terminal selects the TN base station as the first base station according to the access priorities.

3. The method according to claim 1, wherein the performing of the MA PDU session establishment procedure comprises:
- transmitting, to the core network, a PDU session establishment request including at least one of information indicating an MA PDU session according to dual-steering or session identifier (ID) information;
- receiving a response to the PDU session establishment request from the core network; and
- identifying whether the MA PDU session establishment procedure is successful based on the response,
- wherein when the response indicates acceptance of PDU session establishment, the MA PDU session establishment procedure is determined to be successful, and the PDU session establishment request and the response are transmitted and received through the first base station.

4. The method according to claim 1, further comprising: in response to identifying that the MA PDU session establishment procedure is successful based on a result of the MA PDU session establishment procedure, performing data communication between the terminal and the core network, wherein the data communication is performed through at least one of the first base station or the second base station.

5. The method according to claim 1, wherein the performing of the first access registration procedure comprises:
- performing a radio resource control (RRC) connection establishment procedure between the terminal and the first base station;
- transmitting a first registration request including at least one of registration type information or dual-steering capability information to the core network;

performing an identification procedure, an authentication procedure, and a non-access stratum (NAS) security control procedure between the terminal and the core network;

performing an access stratum (AS) security control procedure with the first base station;

receiving a response to the first registration request from the core network; and identifying whether the core network supports dual-steering, based on the response indicating acceptance of registration.

6. The method according to claim 5, wherein the registration request and the response to the registration request are transmitted and received through the first base station, and when the response includes dual-steering support information indicating whether dual-steering is supported, the registration request is determined to be successfully performed.

7. The method according to claim 1, wherein the performing of the second access registration procedure comprises:

performing an RRC connection establishment procedure between the terminal and the second base station;

transmitting, to the core network, a registration request including information indicating mobility registration updating;

performing a NAS security control procedure between the terminal and the core network;

performing an AS security control procedure between the terminal and the second base station; and receiving a response to the registration request from the core network, wherein communication between the terminal and the core network is performed through the second base station, and when the response indicates acceptance of registration, the second access registration procedure is determined to be successful.

8. The method according to claim 1, further comprising: in response to identifying that the core network does not support dual-steering, performing a single access (SA) PDU session establishment procedure through the first base station, wherein in the SA PDU session establishment procedure, the terminal transmits an SA PDU session request to the core network, the terminal receives an SA PDU session response from the core network, and when the terminal receives a PDU session establishment accept in response to the SA PDU session request from the core network, the SA PDU session establishment is determined to be successful.

9. A method of a terminal, comprising:

selecting a terrestrial network (TN) base station;

performing a first access registration procedure between the terminal and a core network;

identifying whether the core network supports dual-steering, based on a result of the first access registration procedure;

in response to identifying that the core network supports dual-steering, performing a first protocol data unit (PDU) session establishment procedure between the terminal and the core network;

in response to that the terminal camps on a non-terrestrial network (NTN) base station, performing a second access registration procedure between the terminal and the core network; and in response to a success of the second access registration procedure, performing a second PDU session establishment procedure between the terminal and the core network, wherein in the first access registration procedure and the first PDU session establishment procedure, communication between the terminal and the core network is performed through the TN base station, and in the second access registration procedure and the second PDU session establishment procedure, communication between the terminal and the core network is performed through the NTN base station.

10. The method according to claim 9, wherein the TN base station and the NTN base station are base stations belonging to a home public land mobile network (PLMN), the terminal is able to use only one of the TN base station or the NTN base station, and the terminal camps on the NTN base station after the terminal performs camping-on, registration, and PDU session establishment procedures with the TN base station.

11. The method according to claim 9, wherein the performing of the first PDU session establishment procedure comprises:

transmitting, to the core network, a first PDU session establishment request including at least one of first information indicating a multiple access (MA) PDU session according to dual-steering or first session identifier (ID) information;

receiving a first response to the first PDU session establishment request from the core network; and determining whether the first PDU session establishment procedure is successful based on the first response, wherein when the first response indicates acceptance of PDU session establishment, the first PDU session establishment procedure is determined to be successful.

12. The method according to claim 9, wherein the performing of the second PDU session establishment procedure comprises:

transmitting, to the core network, a second PDU session establishment request including at least one of second information indicating an MA PDU session according to dual-steering or second session ID information;

receiving a second response to the second PDU session establishment request from the core network; and determining whether the second PDU session establishment procedure is successful based on the second response, wherein when the second response indicates acceptance of PDU session establishment, the second PDU session establishment procedure is determined to be successful, and the second session ID information included in the second PDU session establishment request includes a session ID identical to the first session ID information included in the first PDU session establishment request in the first PDU session establishment procedure.

13. The method according to claim 9, wherein the performing of the first access registration procedure comprises:

transmitting, to the core network, a first registration request including at least one of registration type information or dual-steering capability information;

receiving a first response to the first registration request from the core network; and determining whether the first access registration procedure is successful based on the first response, wherein when the first response indicates acceptance of registration including dual-steering support information indicating whether the core network supports dual-steering, the first registration procedure is determined to be successful.

14. The method according to claim 9, wherein the performing of the second access registration procedure comprises:

transmitting, to the core network, a second registration request including information indicating mobility registration updating;

receiving a second response to the second registration request from the core network; and determining whether the second access registration procedure is successful based on the second response, wherein when the second response indicates acceptance of registration, the second access registration procedure is determined to be successful.

15. The method according to claim 9, wherein the performing of the first access registration procedure comprises:

performing a first identification procedure between the terminal and the core network;

performing a first authentication procedure between the terminal and the core network; and performing a first non-access stratum (NAS) security control procedure between the terminal and the core network.

16. The method according to claim 15, wherein the performing of the second access registration procedure comprises: performing a second NAS security control procedure between the terminal and the core network, and in the second access registration procedure, an identification procedure and authentication procedure between the terminal and the core network are omitted.

17. The method according to claim 9, further comprising: in response to identifying that the core network does not support dual-steering, performing a signal access (SA) PDU session establishment procedure, wherein in the SA PDU session establishment procedure, the terminal transmits an SA PDU session request to the core network, the terminal receives an SA PDU session response from the core network, and when the terminal receives a PDU session establishment accept in response to the SA PDU session request from the core network, the SA PDU session establishment procedure is determined to be successful, and in the SA PDU session establishment procedure, communication between the terminal and the core network is performed through the TN base station.

18. A terminal comprising at least one processor, wherein the at least one processor causes the terminal to perform:

performing a first access registration procedure between the terminal and a core network through a terrestrial network (TN) base station;

identifying whether the core network supports dual-steering based on a result of the first access registration procedure;

in response to identifying that the core network supports dual-steering, performing a first protocol data unit (PDU) session establishment procedure between the terminal and the core network;

in response to the terminal camping on a non-terrestrial network (NTN) base station, performing a second access registration procedure between the terminal and the core network; and in response to a success of the second access registration procedure between the terminal and the core network, performing a second PDU session establishment procedure between the terminal and the core network, wherein the TN base station is a base station belonging to a home public land mobile network (PLMN), and the NTN base station is a base station belonging to a visited PLMN.

19. The terminal according to claim 18, wherein in the first PDU session establishment procedure, the at least one processor causes the terminal to perform:

transmitting, to the core network, a first PDU session establishment request including at least one of first information indicating a multiple access (MA) PDU session according to dual-steering or first session identifier (ID) information; and receiving a first response to the first PDU session establishment request from the core network, wherein when the first response indicates acceptance of PDU session establishment, the first PDU session establishment procedure is determined to be successful.

20. The terminal according to claim 18, wherein in the second PDU session establishment procedure, the at least one processor causes the terminal to perform:

transmitting, to the core network, a second PDU session establishment request including at least one of second information indicating an MA PDU session according to dual-steering or second session ID information; and receiving a second response to the second PDU session establishment request from the core network, wherein when the second response indicates acceptance of PDU session establishment, the second PDU session establishment procedure is determined to be successful.

* * * * *